US010129307B2

(12) United States Patent

Negalaguli et al.

(10) Patent No.: US 10,129,307 B2

(45) Date of Patent: Nov. 13, 2018

(54) PTT NETWORK WITH RADIO CONDITION AWARE MEDIA PACKET AGGREGATION SCHEME

(71) Applicant: Kodiak Networks Inc., Plano, TX (US)

(72) Inventors: Harisha M. Negalaguli, Richardson, TX (US); Krishnakant M. Patel, Richardson, TX (US); Brahmananda R. Vempati, Dallas, TX (US); Abhishek Subhashkumar Jain, Irving, TX (US)

(73) Assignee: KODIAK NETWORKS INC., Plano, TX (US)

( * ) Notice: Subject to any disclaimer, the term of this patent is extended or adjusted under 35 U.S.C. 154(b) by 39 days.

(21) Appl. No.: 15/287,014

(22) Filed: Oct. 6, 2016

(65) Prior Publication Data

US 2017/0099327 A1 Apr. 6, 2017

Related U.S. Application Data

(60) Provisional application No. 62/272,867, filed on Dec. 30, 2015, provisional application No. 62/237,965, filed on Oct. 6, 2015.

(51) Int. Cl.

*H04L 29/06* (2006.01)

*H04B 7/06* (2006.01)

(Continued)

(52) U.S. Cl.

CPC ....... *H04L 65/4061* (2013.01); *H04B 7/0632* (2013.01); *H04L 1/00* (2013.01);

(Continued)

(58) Field of Classification Search

CPC ..... H04L 65/4061; H04L 1/00; H04L 49/355; H04L 67/42; H04L 69/22; H04L 5/0048;

(Continued)

(56) References Cited

U.S. PATENT DOCUMENTS 3,912,874 A 10/1975 Botterell et al.
4,796,293 A 1/1989 Blinken et al.

(Continued)

FOREIGN PATENT DOCUMENTS

GB 2338150 A 3/1998
JP 200392776 A 10/2004

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

(Continued)

*Primary Examiner* — Mewale A Ambaye

(57) ABSTRACT

A method of operating a client device in a Push-to-talk (PTT) network includes monitoring, by the client device, radio conditions of the PTT network, and generating a radio condition parameter by the client device. The method also includes calculating, by the client device, an estimate of Channel Quality Indicator (CQI) using the radio condition parameter, and determining, by the client device, a first Modulation and Coding Scheme (MCS) in accordance with the estimate of CQI.

16 Claims, 20 Drawing Sheets

(51) Int. Cl.

| | |
|---|---|
| ***H04L 5/00*** | (2006.01) |
| ***H04W 4/10*** | (2009.01) |
| ***H04L 1/00*** | (2006.01) |
| *H04L 12/931* | (2013.01) |
| *H04W 88/10* | (2009.01) |
| *H04W 80/10* | (2009.01) |

(52) U.S. Cl.
CPC .......... *H04L 1/0015* (2013.01); *H04L 1/0025* (2013.01); *H04L 5/0048* (2013.01); *H04L 65/607* (2013.01); *H04L 67/42* (2013.01); *H04L 69/22* (2013.01); *H04W 4/10* (2013.01); *H04L 1/0003* (2013.01); *H04L 1/0009* (2013.01); *H04L 1/0014* (2013.01); *H04L 49/355* (2013.01); *H04L 2001/0093* (2013.01); *H04W 80/10* (2013.01); *H04W 88/10* (2013.01)

(58) Field of Classification Search
CPC ...... H04L 65/607; H04W 4/10; H04W 80/10; H04W 88/10
See application file for complete search history.

(56) References Cited

U.S. PATENT DOCUMENTS 5,212,832 A 5/1993 Ness-Cohn
5,293,449 A 3/1994 Tzeng
5,353,328 A 10/1994 Jokimies
5,442,809 A 8/1995 Diaz et al.
5,546,449 A 8/1996 Hogan et al.
5,711,011 A 1/1998 Urs et al.
5,752,196 A 5/1998 Ahvenainen et al.
5,987,318 A 11/1999 Alperovich et al.
5,987,331 A 11/1999 Grube et al.
6,011,976 A 1/2000 Michaels et al.
6,021,326 A 2/2000 Nguyen
6,138,011 A 10/2000 Sanders, III et al.
6,141,556 A 10/2000 Dougherty et al.
6,192,119 B1 2/2001 Wilson
6,304,558 B1 10/2001 Mysore
6,397,054 B1 5/2002 Hoirup et al.
6,405,030 B1 6/2002 Suprunov
6,411,815 B1 6/2002 Balasuriya
6,473,501 B1 10/2002 Paulsrud
6,477,366 B1 11/2002 Valentine et al.
6,477,387 B1 11/2002 Jackson et al.
6,549,773 B1 4/2003 Linden et al.
6,577,874 B1 6/2003 Dailey
6,606,305 B1 8/2003 Boyle et al.
6,628,937 B1 9/2003 Salin
6,661,878 B1 12/2003 Mirashrafi et al.
6,725,053 B2 4/2004 Rosen et al.
6,751,468 B1 6/2004 Heubel et al.
6,801,762 B1 10/2004 Huilgol
6,856,676 B1 2/2005 Pirot et al.
6,865,398 B2 3/2005 Mangal et al.
6,892,074 B2 5/2005 Tarkiainen et al.
6,895,254 B2 5/2005 Dorenbosch
6,898,436 B2 5/2005 Crockett et al.
6,993,355 B1 1/2006 Pershan
6,996,414 B2 2/2006 Vishwanathan et al.
7,026,926 B1 4/2006 Walker, III
7,043,266 B2 6/2006 Chaturvedi et al.
7,082,316 B2 7/2006 Elden et al.
7,085,364 B1 8/2006 Ahmed et al.
7,099,291 B2 8/2006 Harris et al.
7,123,905 B1 10/2006 Allaway et al.
7,170,863 B1 1/2007 Denman et al.
7,231,225 B2 6/2007 Rao et al.
7,236,580 B1 6/2007 Sarkar et al.
7,330,540 B2 2/2008 Darby et al.
7,366,535 B2 4/2008 Glass et al.
7,403,775 B2 7/2008 Patel et al.
7,460,861 B2 12/2008 Zabawskj
7,529,557 B2 5/2009 Farrill
7,689,238 B2 3/2010 Biswas et al.
7,738,861 B2 6/2010 Fournier
7,738,892 B2 6/2010 Ayyasamy et al.
7,738,896 B2 6/2010 Patel et al.
7,751,348 B2 7/2010 Shaffer et al.
7,764,950 B2 7/2010 Patel et al.
7,787,896 B2 8/2010 Kundu et al.
7,797,010 B1 9/2010 Manroa et al.
7,813,722 B2 10/2010 Patel et al.
7,853,279 B2 12/2010 Patel et al.
8,036,692 B2 10/2011 Ayyasamy et al.
8,244,252 B2 8/2012 Descombes
8,369,829 B2 2/2013 Nagubhai et al.
8,478,261 B2 7/2013 Vempati et al.
8,498,660 B2 7/2013 Lawler et al.
8,670,760 B2 3/2014 Lawler et al.
8,676,189 B2 3/2014 Lawler et al.
8,913,494 B1 12/2014 Marupaduga et al.
9,282,130 B1 * 3/2016 Goepp ................ H04L 12/1818
2001/0005372 A1 6/2001 Cave et al.
2002/0009990 A1 1/2002 Kleier et al.
2002/0024943 A1 2/2002 Karaul et al.
2002/0077136 A1 6/2002 Maggenti et al.
2002/0086659 A1 7/2002 Lauper
2002/0086676 A1 7/2002 Hendrey et al.
2002/0102989 A1 8/2002 Calvert et al.
2002/0187750 A1 12/2002 Majumdar
2002/0196781 A1 12/2002 Salovuori
2003/0009463 A1 1/2003 Gallant
2003/0016632 A1 1/2003 Refai et al.
2003/0017836 A1 1/2003 Vishwanathan et al.
2003/0078064 A1 4/2003 Chan
2003/0119540 A1 6/2003 Mathis
2003/0148779 A1 8/2003 Aravamudan et al.
2003/0149774 A1 8/2003 McConnell et al.
2003/0153343 A1 8/2003 Crockett et al.
2003/0190888 A1 10/2003 Mangal et al.
2004/0032843 A1 2/2004 Schaefer et al.
2004/0057449 A1 3/2004 Black
2004/0067751 A1 4/2004 Vandermeijden et al.
2004/0095954 A1 5/2004 Varney et al.
2004/0121760 A1 6/2004 Wetman et al.
2004/0127233 A1 7/2004 Harris et al.
2004/0152441 A1 8/2004 Wong
2004/0176100 A1 9/2004 Florkey et al.
2004/0179531 A1 9/2004 Bi et al.
2004/0196826 A1 10/2004 Bao et al.
2004/0203793 A1 10/2004 Dorenbosch
2004/0219941 A1 11/2004 Haaramo et al.
2004/0224710 A1 11/2004 Koskelainen et al.
2004/0228292 A1 11/2004 Edwards
2004/0259580 A1 12/2004 Florkey et al.
2005/0047362 A1 3/2005 Harris et al.
2005/0101308 A1 5/2005 Lee
2005/0111430 A1 5/2005 Spear et al.
2005/0119012 A1 6/2005 Merheb et al.
2005/0143135 A1 6/2005 Brems et al.
2005/0164737 A1 7/2005 Brown
2005/0189337 A1 9/2005 Baune
2005/0192041 A1 9/2005 Oxley et al.
2005/0202807 A1 9/2005 Ayyasamy et al.
2005/0221819 A1 10/2005 Patel et al.
2005/0232241 A1 10/2005 Wu et al.
2005/0239485 A1 10/2005 Kundu et al.
2005/0254464 A1 11/2005 Patel et al.
2005/0255811 A1 11/2005 Allen et al.
2005/0261016 A1 11/2005 Patel et al.
2006/0003740 A1 1/2006 Munje
2006/0003751 A1 1/2006 Vo
2006/0019654 A1 1/2006 Farrill
2006/0029189 A1 2/2006 Patel et al.
2006/0030347 A1 2/2006 Biswas
2006/0056361 A1 3/2006 Jiang et al.
2006/0067499 A1 3/2006 Oliveira et al.
2006/0078064 A1 4/2006 Schmidt et al.
2006/0094455 A1 5/2006 Hannu et al.
2006/0116150 A1 6/2006 Bhutiani

(56) References Cited

U.S. PATENT DOCUMENTS

2006/0128411 A1 6/2006 Turcanu
2006/0178138 A1 8/2006 Ostroff et al.
2006/0189337 A1 8/2006 Farrill et al.
2006/0198334 A1 9/2006 Civanlar et al.
2006/0229090 A1 10/2006 Ladue
2006/0234687 A1 10/2006 Patel et al.
2007/0037562 A1 2/2007 Smith-Kerker et al.
2007/0037597 A1 2/2007 Biswas et al.
2007/0037598 A1 2/2007 Ayyasamy et al.
2007/0049314 A1 3/2007 Balachandran et al.
2007/0070976 A1 3/2007 Mussman et al.
2007/0094409 A1* 4/2007 Crockett ................. H04L 29/06 709/233
2007/0099609 A1 5/2007 Cai
2007/0133478 A1* 6/2007 Armbruster ........... H04L 1/0015 370/335
2007/0133757 A1 6/2007 Girouard et al.
2007/0154005 A1 7/2007 Daigle
2007/0177602 A1* 8/2007 Pichelin .................. H04W 4/10 370/395.2
2007/0189487 A1 8/2007 Sharland et al.
2007/0190492 A1 8/2007 Schmitt
2007/0190984 A1 8/2007 Ayyasamy et al.
2007/0197234 A1 8/2007 Gill et al.
2007/0204039 A1 8/2007 Inamdar
2007/0217591 A1 9/2007 Yasuma
2007/0218885 A1 9/2007 Pfleging et al.
2007/0253347 A1 11/2007 Patel et al.
2008/0064364 A1 3/2008 Patel et al.
2008/0126230 A1 5/2008 Bellora et al.
2008/0147671 A1 6/2008 Simon et al.
2008/0159128 A1 7/2008 Shaffer et al.
2008/0299953 A1 12/2008 Rao
2009/0080356 A1 3/2009 Song et al.
2009/0092116 A1 4/2009 Jiang et al.
2009/0119678 A1 5/2009 Shih et al.
2009/0149167 A1 6/2009 Patel et al.
2009/0161590 A1 6/2009 Lewis et al.
2009/0209235 A1 8/2009 Lawler et al.
2009/0279512 A1* 11/2009 Fujishima ............ H04B 7/0617 370/336
2009/0325540 A1 12/2009 Yach et al.
2010/0035593 A1 2/2010 Fanco et al.
2010/0142414 A1 6/2010 Patel et al.
2010/0190492 A1 7/2010 Jiang
2010/0197335 A1 8/2010 Jin et al.
2010/0234018 A1 9/2010 Lawler et al.
2011/0151917 A1 6/2011 Mao et al.
2011/0183659 A1 7/2011 Ayyasamy et al.
2011/0250923 A1 10/2011 Miller et al.
2012/0026947 A1 2/2012 Miller et al.
2012/0278496 A1 11/2012 Hsu
2013/0021933 A1 1/2013 Kovvali et al.
2013/0021965 A1 1/2013 Chu et al.
2013/0084911 A1 4/2013 Chang
2013/0136025 A1 5/2013 Li et al.
2013/0155875 A1 6/2013 Ayyasamy et al.
2013/0196706 A1 8/2013 Patel et al.
2013/0272436 A1* 10/2013 Makhlouf ............ H04J 11/0066 375/260
2013/0315164 A1 11/2013 Arur et al.
2013/0337859 A1 12/2013 Patel et al.
2014/0056220 A1 2/2014 Poitau et al.
2014/0078898 A1 3/2014 Anchan et al.
2014/0133443 A1 5/2014 Malladi et al.
2014/0148210 A1 5/2014 Kundu et al.
2014/0219083 A1 8/2014 Mandyam et al.
2014/0219255 A1 8/2014 Eyuboglu et al.
2014/0226746 A1 8/2014 Ko et al.
2014/0274080 A1 9/2014 Gilbert et al.
2015/0078295 A1 3/2015 Mandyam et al.
2015/0085797 A1 3/2015 Ji et al.
2015/0092704 A1* 4/2015 Chen ................. H04W 72/1231 370/329
2015/0117347 A1 4/2015 Iwai
2015/0163039 A1 6/2015 Davydov et al.
2015/0173107 A1 6/2015 Newberg et al.
2015/0245326 A1* 8/2015 Rune ..................... H04L 1/0003 370/329
2015/0365961 A1 12/2015 Strasman et al.
2016/0269945 A1 9/2016 Jang et al.
2016/0277992 A1 9/2016 Cao

FOREIGN PATENT DOCUMENTS

WO 00069189 11/2000
WO 0079825 A1 12/2000
WO 0167674 A2 9/2001
WO 02101981 A1 12/2002
WO 03101007 A1 12/2003
WO 2005009006 A2 1/2005
WO 2005112494 A1 11/2005
WO 2005115032 A1 12/2005
WO 2005117474 A1 12/2005
WO 2006105287 A2 10/2006
WO 2010048217 A1 4/2010
WO 2010117815 A1 10/2010
WO 2014169461 A1 10/2014
WO 2015105970 A1 7/2015

OTHER PUBLICATIONS

Nokia: “What is TETRA? Why Nokia TETRA?”, The Nokia TETRA Primer, 2002, pp. 1-29.

Skype: “Skype”, Web Archive—Skype, May 22, 2004, pp. 1-2, May 22, 2004, pp. 1-2.

Trachwell: “TrackWell Software and Tetra Iceland deliver value added services to Tetra users”, trackwell.com, Oct. 2002, pp. 1-1.

* cited by examiner

750

| MCS INDEX $I_{MCS}$ | TBS INDEX $I_{TBS}$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 9 |
| 11 | 10 |
| 12 | 11 |
| 13 | 12 |
| 14 | 13 |
| 15 | 14 |
| 16 | 15 |
| 17 | 15 |
| 18 | 16 |
| 19 | 17 |
| 20 | 18 |
| 21 | 19 |
| 22 | 20 |
| 23 | 21 |
| 24 | 22 |
| 25 | 23 |
| 26 | 24 |
| 27 | 25 |
| 28 | 26 |
| 29 | RESERVED |
| 30 | |
| 31 | |

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 88 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

PACKET DATA SIZE TABLE EXAMPLE

| CODEC RATE | 2600 | BPS | | | | | | | | | |
|---|---|---|---|---|---|---|---|---|---|---|---|
| CODEC DATA PER 20ms | 52 | BITS PER 20ms FRAME | | | | | | | | | |
| | 6.5 | BYTES | | | | | | | | | |
| RTP HEADER OVERHEAD | 12 | BYTES | | | | | | | | | |
| IP HEADER OVERHEAD | 20 | BYTES | | | | | | | | | |
| UDP HEADER OVERHEAD | 20 | BYTES | | | | | | | | | |
| RoHC HEADER OVERHEAD | 2 | BYTES | | | | | | | | | |
| TOTAL OVERHEAD WITHOUT RoHC | 52 | BYTES | | | | | | | | | |
| TOTAL OVERHEAD WITH RoHC | 14 | BYTES | | | | | | | | | |
| | | | | | | | | | | | |
| PACKET RATE (CODEC FRAMES/PKT) | 4 | 5 | 6 | 7 | 8 | 9 | 10 | 11 | 12 | 13 | 14 |
| TOTAL CODEC DATA PER IP PACKET (NUMBER OF BYTES) | 26 | 32.5 | 39 | 45.5 | 52 | 58.5 | 65 | 71.5 | 78 | 84.5 | 91 |
| PACKET SIZE WITHOUT RoHC (NUMBER OF BYTES) | 78 | 84.5 | 91 | 97.5 | 104 | 110.5 | 117 | 123.5 | 130 | 136.5 | 143 |
| PACKET SIZE WITHOUT RoHC (NUMBER OF BITS) | 624 | 676 | 728 | 780 | 832 | 884 | 936 | 988 | 1040 | 1092 | 1144 |
| PACKET SIZE WITH RoHC (NUMBER OF BYTES) | 40 | 46.5 | 53 | 59.5 | 66 | 72.5 | 79 | 85.5 | 92 | 98.5 | 105 |
| PACKET SIZE WITH RoHC (NUMBER OF BITS) | 320 | 372 | 424 | 476 | 528 | 580 | 632 | 684 | 736 | 788 | 840 |

FIG. 9

```
INVITE sip:confFactory@poc1demo.com;lr SIP/2.0
Via: SIP/2.0/TCP 10.255.251.72:31560;branch=z9hG4bKl6DTT
v:SIP/2.0/TCP 10.66.52.18:4150;rport;branch=z9hG4bKl6DTT
Max-Forwards: 70
f: tel:+14048041371;tag=AVy1Om3rDq
t: sip:confFactory@poc1demo.com
m: "Gobi-Comanche " <sip:10.66.52.18:4150>;+g.poc.talkburst
i: EY.4sQ9kT28WiQbb
CSeq: 10358 INVITE
Route: <sip:poc1demo.kodiaknetworks.com;lr>
k: timer
KPoc: 0;pv=7.0;mcs=12;fr=14
X-KN-PoC-Flags: media-fqdn;media-encrypted;media-transport=udp-only
c: application/sdp
l:   327
X-Kn-Session-ID: 166.173.56.249_22047;vstype=3
X-Kn-ClientInfo: IPv4_166.173.56.249_22047_TLS;pttid=711001
```

PTT NETWORK WITH RADIO CONDITION AWARE MEDIA PACKET AGGREGATION SCHEME

PRIORITY CLAIM

This application claims the benefit of U.S. Provisional Application No. 62/272,867, filed on Dec. 30, 2015 and entitled "LTE Radio Condition Aware Media Packet Aggregation Scheme to Adjust PTT Capacity," and the benefit of U.S. Provisional Application No. 62/237,965, filed on Oct. 6, 2015 and entitled "RAN Efficient PTT Service Delivery Over LTE," which applications are incorporated herein by reference in their entireties.

TECHNICAL FIELD

The present invention relates generally to a mobile network, and in particular, to a Push-to-talk (PTT) network.

BACKGROUND

Push-to-talk (PTT) platforms involve providing PTT functionalities (e.g., call group management, call origination, call transmittal, talk-back call termination, floor management, filtering, etc.) through clients on client devices. The PTT functions may be performed by one or more servers, and communications between the client devices and the servers may be performed over a telecommunications network (e.g., a carrier network such as a Long Term Evolution (LTE) network).

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates a look-up table showing a mapping between MCS indices and Transport Block Size (TBS) indices, in some embodiments;

FIGS. 8A and 8B illustrate two look-up tables for determining the Transport Block Size (TBS) based on the TBS index and the number of PRBs, in some embodiments;

FIG. 9 illustrates an example of determining the number of media frames in a packet, in some embodiments;

FIG. 19 illustrates an SIP INVITE message, in some embodiments;

DETAILED DESCRIPTION OF ILLUSTRATIVE EMBODIMENTS

The making and using of the illustrative embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed devices, systems and methods, and do not limit the scope of the disclosure.

A system and method for improving the capacity of a Push-to-talk (PTT) system is provided in accordance with various embodiments. In particular, users of a telecommunications services platform (e.g., a PTT platform) may access the platform using a radio access network (RAN). The RAN may act as a communications medium between an application client on a client device and servers of the telecommunications services platform. The application client is configured to provide a suggested Modulation and Coding Scheme (MCS) and a suggest frame rate to the application server (e.g., PTT server) based on channel conditions of the RAN. Based on the suggested frame rates and suggested MCS, as well as various other factors, the application server determines and sends a second MCS and a second frame rate to the application client. The second MCS and second frame rate may or may not be the same as the suggested MCS and suggested frame rate. Packets are transmitted and received between the application client and the application server using the second MCS and the second frame rate.

Figure 1:
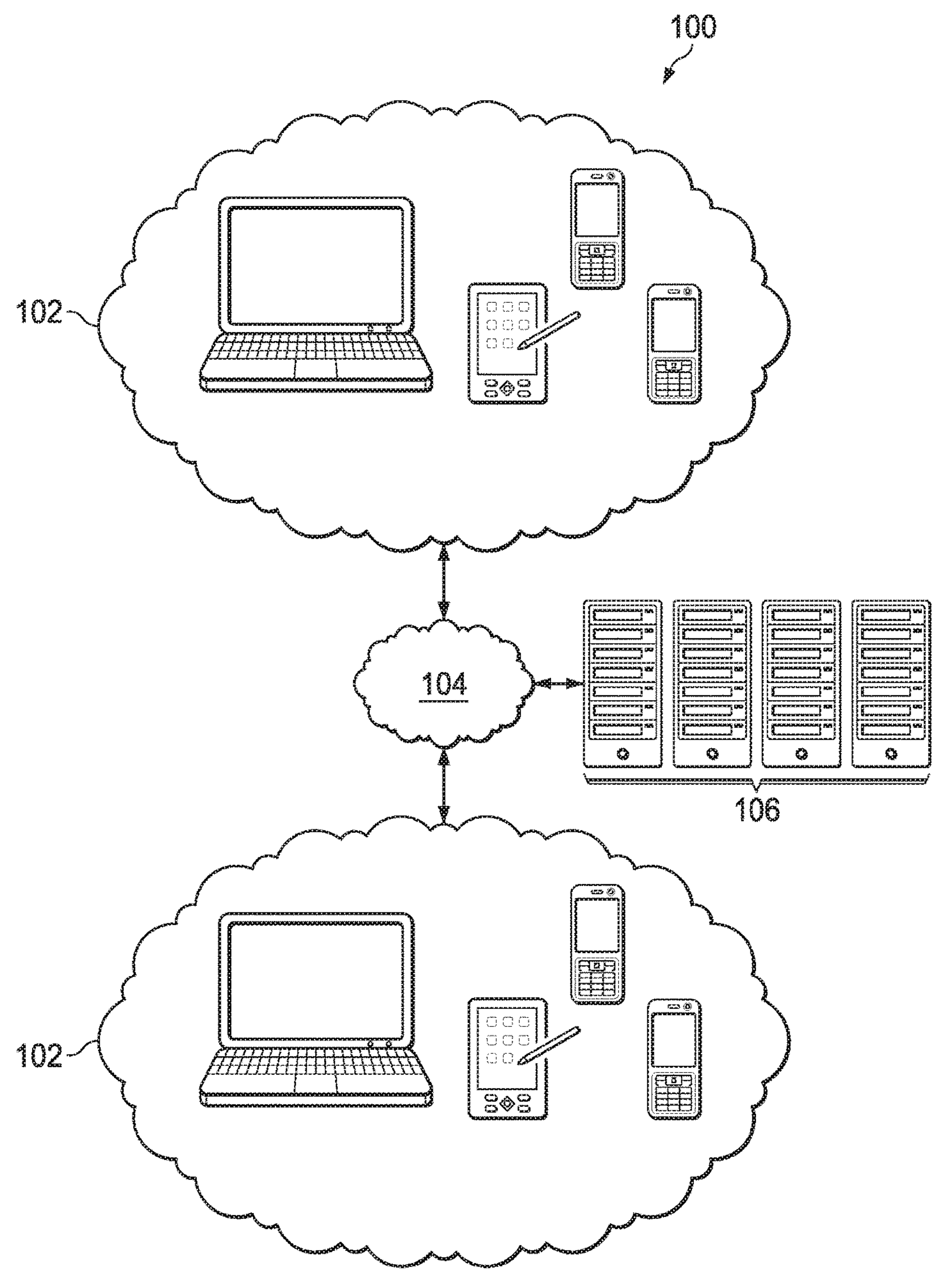
FIG. 1 illustrates a diagram of a communications system, in some embodiment.

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as PTT functions, provided by the telecommunications solution.

Client devices 102 may communicate with the telecommunications services platform 106 over the communications network 104, which may be accessed by the client devices 102 through a cellular network deployed by a carrier, a WiFi network, a Radio Access Network (RAN), other wireless networks, a wired internet protocol (IP) network, combinations thereof, or the like. Communications network 104 may include one or more components (e.g., base stations) configured to provide wireless or wired network access, such as an enhanced Node B (eNodeB), a macro-cell, a femtocell, a Wi-Fi access point (AP), combinations thereof, or the like. Furthermore, communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, communications network 104 may comprise various other devices, such as relays, low power nodes, etc. Communications network 104 may further include backhaul network components, such as various gateways, routers, controllers, schedulers, and the like.

In an embodiment where telecommunications services platform 106 is a Push-to-talk over cellular (PoC) platform, subscribers to a PIT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, telecommunications services platform 106 incorporates distributed databases, clustering technologies, data analytics tools, and messaging middleware to provide a robust, scalable platform. Telecommunications services platform 106 may use fully virtualized components with a layered approach to service orchestration, which allows telecommunications services platform 106 to be integrated into various cloud environments, such as a carrier's private cloud infrastructure, a dedicated PIT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

The traffic patterns of PTT typically have several characteristics. Group calls are common, which may require a large number of radio resources to be simultaneously used and may require significant downlink traffic compared to uplink traffic. Traffic is typically one-way, e.g., a particular speech direction (talker to listener(s)), and there may be a clear indication of speech direction changes (via a floor control). For example, at any given point-in-time during a call, only a user with floor control speaks with the other participants (e.g., users without floor control) of the call listening. The end-to-end call setup time is typically critical, and in some embodiments may need to be less than about 500 ms. The floor request ACK time may also be critical, and in some embodiments may need to be less than about 200 ms. Calls are typically shorter, but more frequent, and call setup/teardown may be performed frequently. There may be fewer silence periods between speech, and participants typically release the floor when they are not talking.

An embodiment communications network 104 may have an available spectrum (e.g., channel bandwidth) set by a telecommunications standard. For example, an embodiment communications network 104 may be in accordance with Third Generation Partnership Project (3GPP) standards, and provide channel bandwidths of 1.4, 5, 10, and 20 MHz. An embodiment communications network 104 may further provide a 2×2 Multiple Input Multiple Output (MIMO) MCS scheme. Base stations and client devices in communications network 104 may rely on radio-frequency (RF) quality metrics, such as Channel Quality Indicators (CQIs) to select an appropriate MCS for communications. In general, a CQI indicates a maximum possible data rate at current signal-to-noise conditions of a connection between a client device and a base station. CQI values range from one to fifteen, and a lower CQI number indicates a lower maximum possible data rate and a corresponding lower Signal-to-Noise Ratio (SNR). In an embodiment communications network 104, client devices 102 provide CQI measurements to base stations of communications network 104, and communications network 104 uses the reported CQI value for cell capacity estimation, scheduling, and the like.

Figure 2:
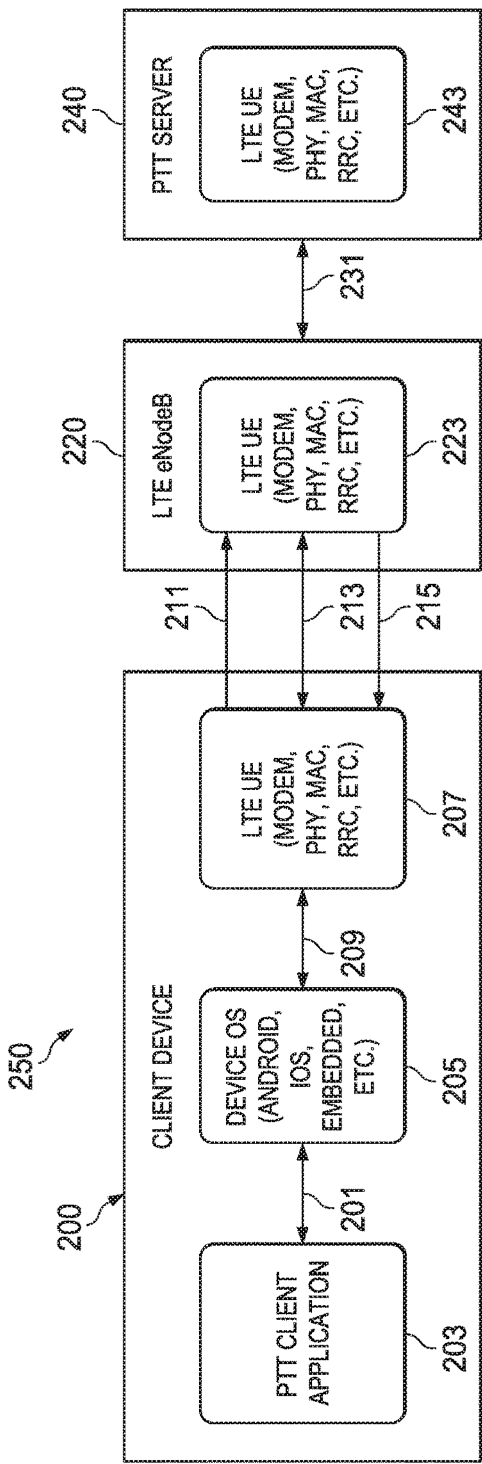
FIG. 2 illustrates a system diagram of a PTT system, in some embodiments.

FIG. 2 is a system diagram illustrating a PTT system (may also be referred to as a PTT network) 250, in accordance with some embodiments. PTT system 250 includes a client device 200 (e.g., an UE), an LTE eNodeB 220, and a PTT server (may also be referred to as PTT network server) 240. In the discussion below, the term "client device" may be used interchangeably with the term "UE." Each of UE 200, LTE eNodeB 220 and PTT server 240 has a communication module (e.g., communication module 207 for UE 200, communication module 223 for LTE eNodeB 220, and communication module 243 for PTT server 240) that is configured to transmit and receive data via the LTE air interface. Each of the communication modules (e.g., 207, 223, 243) includes hardware (e.g., modem, antennas) and the corresponding firmware/software that are configured to implement functionalities related to, e.g., the Physical (PhY) Layer, the Media Access (MAC) Layer, and the Radio Resource Control (RRC) layer of the LTE standard, in some embodiments. As illustrated in FIG. 2, data communication between UE 200 and PTT server 240 may go through LTE eNodeB 220 first, and LTE eNodeB 220 relays the data to the intended recipient (e.g., UE 200 or PTT server 240). Note that FIG. 2 illustrates high level diagram of PTT system 200, and not all components of PTT system 200 are shown in FIG. 2.

Referring to FIG. 2, UE 200 includes a data communication module 207, an Operating System (OS) 205 (e.g., Android, iOS, or an embedded OS), and a PTT client application module 203. Communication module 207 supports communication with LTE eNobeB 220 through bi-directional data link 213 (e.g., a wireless data link) for transmitting uplink data and receiving downlink data. In addition, communication module 207 continuously monitors the RF channel's radio conditions and calculates various radio condition parameters, such as Reference Signal Received Quality (RSRQ), Received Signal Strength Indicator (RSSI), Signal Strength, and the like, in some embodiments. The OS module 205 transmits to and receives from PTT client application 203 packets, e.g., Universal Datagram Protocol (UDP) packets, Transfer Control Protocol (TCP) packets, or Stream Transmission Control Protocol (SCTP) packets. PTT client application 203 may be a software application running on OS 205 of UE 200. In some embodiments, PTT client application 203 applies Radio Access Network (RAN) aware algorithms (e.g., taking into consideration of radio conditions) to determine a suitable codec, a codec data rate and a frame rate (e.g., number of media frames in a packet such as a Real-time Transport Protocol (RTP) packet) for media frames. In some embodiments, the PTT client application 203 may use inputs from PTT server 240 (e.g., codec type, frame rate) in the RAN aware algorithm.

In some embodiments, UE 200 calculates the CQI based on the radio conditions and device capabilities, and communicates the CQI to LTE eNodeB 220 through data link 211. LTE eNodeB 220 schedules uplink or downlink packets for transmission, and may provide the Timeslot, number of PRBs, frequency information and the MCS to be used to UE 200 through data link 215. Packets, such as RTP packets and/or Internet protocol (IP) packets are communicated between UE 200 and LTE eNodeB 220, and the packets are then communicated between LTE eNodeB 220 and PTT server 240, in the illustrated embodiment.

FIG. 2 illustrates one UE 200, one LTE eNodeB 220, and one PTT server 240. However, other numbers of UE, LET eNodeB, or PTT server could also be used. Although FIG. 2 uses an LTE cellular network as an example, other types of cellular network, currently existing or to be deployed in the future, may also be used and are fully intended to be included within the scope of the present disclosure.

Figure 3:
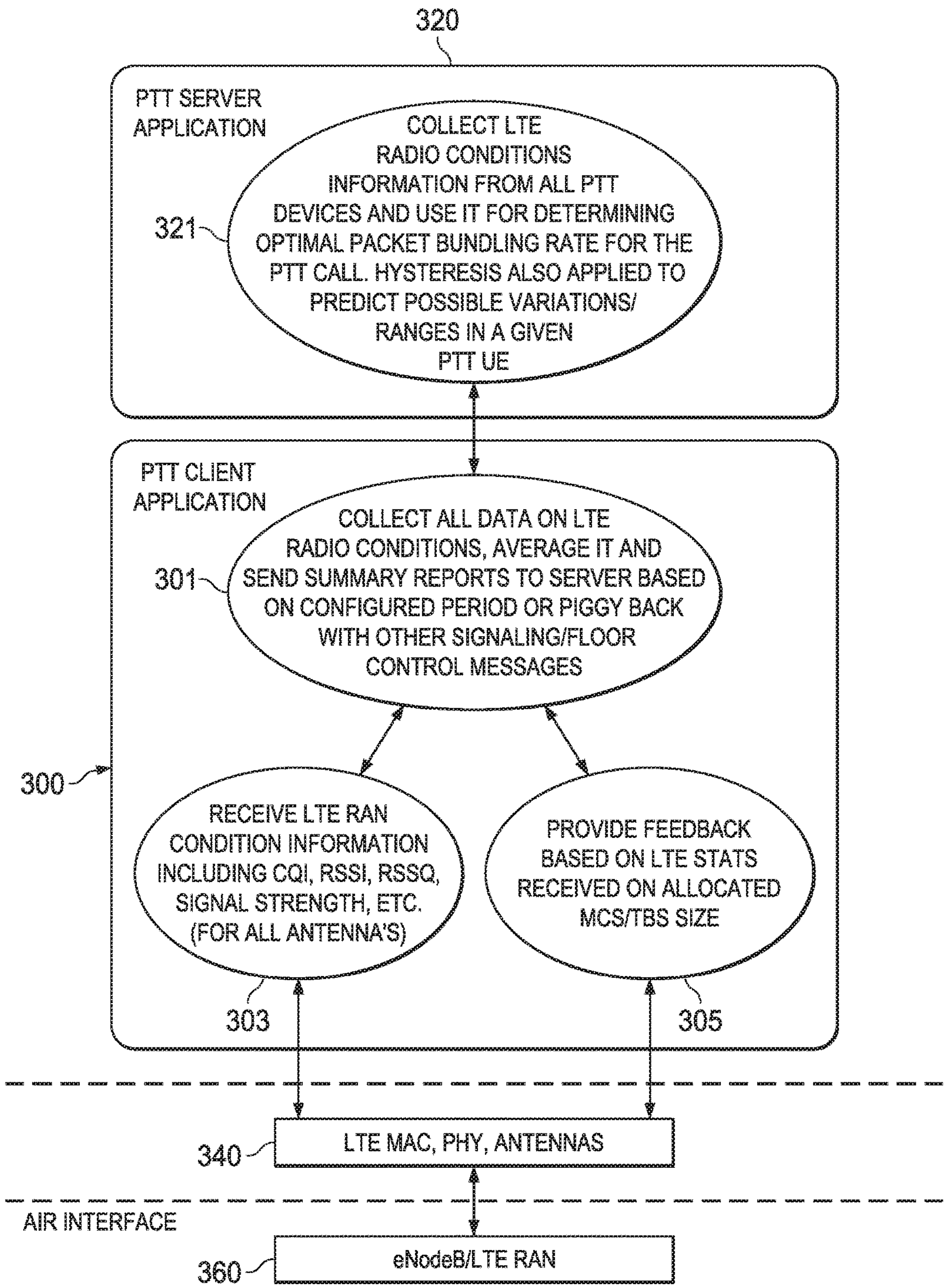
FIG. 3 illustrates a flow diagram of a method for PTT client's reporting of radio conditions to a PTT server, in some embodiments.

FIG. 3 is a flow diagram illustrating a method for reporting LTE radio conditions to the PTT server by the PTT client application, in accordance with some embodiments. As illustrated by FIG. 3, PTT client application 300, which may be similar to PTT client application 203 of UE 200 in FIG. 2, includes three functional modules: a functional module 301, a functional module 303, and a functional module 305. FIG. 3 also illustrates a PTT server application 320 that includes a functional module 321.

Functional module 303 of PTT client application 300 receives LTE RAN radio condition information, which indicates the conditions of the RF channel between the eNodeB/LTE RAN and communication module 340 of the UE. The LTE RAN radio condition information includes parameters such as CQI, RSSI, RSSQ, Signal Strength, and the like, for all antennas of the UE, and is calculated by communication module 340, which may be similar to communication module 207 of UE 200 in FIG. 2.

Functional module 301 of PTT client application 300 collects data on LTE radio conditions, averages the data, and sends summary reports to a PTT server application 320 via signaling messages transmitted between the UE (e.g., UE 200 in FIG. 2) and the PPT server (e.g., PTT server 240 in FIG. 2). Transmission of the signaling messages may be based on a configured period, or piggybacked with other signaling or floor control messages. More details regarding the signaling messages will be described hereinafter with reference to FIGS. 15-19. The summary reports send to module 321 of PTT server application 320 includes the radio conditions and location information of PTT UEs, as examples.

Functional module 305 of PTT client application 300 obtains collected data on LTE radio conditions from module 301, and provides feedback to eNodeB/LTE RAN 360 via communication module 340. The feedback may be based on LTE statistics received on allocated MCS/TBS size.

Module 321 of PTT server application 320 collects the LTE radio condition information from PTT client devices (e.g., all UEs) and uses the collected data for determining packet bundling rate for the PTT call. In some embodiments, hysteresis is applied to predict possible variations/ranges in a given PTT UE.

Figure 4:
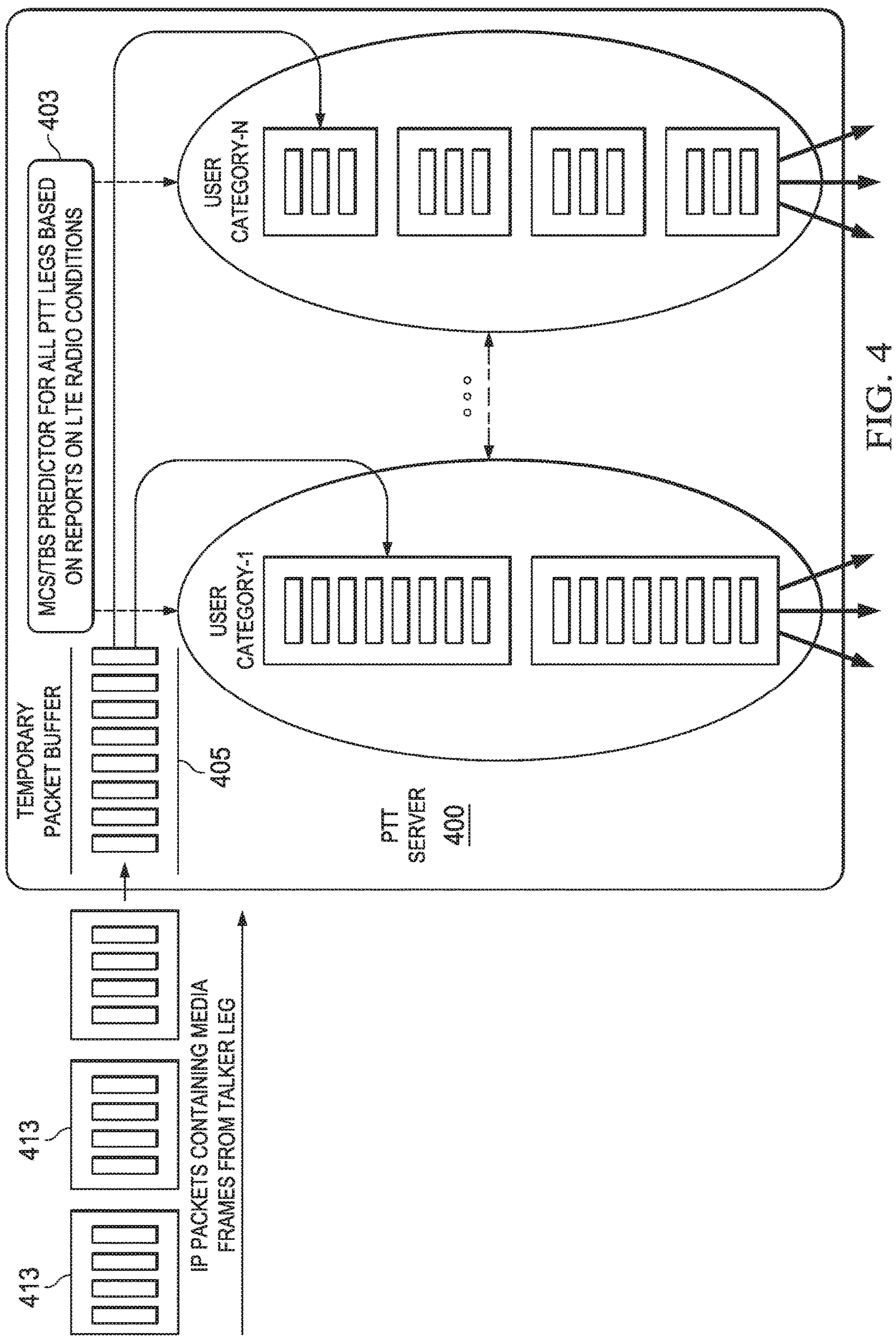
FIG. 4 illustrates a flow diagram of a method for server-side media packet bundling adaptation based on listener device radio conditions, in some embodiments.

FIG. 4 is a flow diagram illustrating a method for server-side media packet bundling adaptation based on listener device radio conditions according to some embodiments. As illustrated in FIG. 4, PTT server 400 receives packets 413 containing media frames (e.g., data frames from a voice codec carrying voice data) from a talker leg such as a client device, another server or network, or the like. Once received, the media frames in packets 413 are de-bundled from packets 413, and the de-bundled media frames are put into a temporary packet buffer 405 for bundling into new packets to be sent to one user or a group of users (e.g., listeners in a PTT group call), in some embodiments. In some embodiments, PTT server 400 includes an MCS/TBS predictor 403, which predicates the MCS/TBS for the PTT users (e.g., listeners in a PTT group call) based on reports of the LTE Radio conditions (e.g., CQI, MCS, RSSI, RSSQ, Signal Strength, and the like) from one or more PTT users in a group call. For example, based on MCS values reported from client devices, the MCS/TBS predictor 403 generates predicted MCS values that may or may be not the same as the reported MCS values from the client devices.

In the illustrated embodiment, PTT server 400 is aware of the location of client devices (e.g., cell level location, or any other broader level location), and each client device's last reported MCS/TBS values and predicted MCS/TBS values, as well as historically reported MCS/TBS values. Based on these information, PTT server 400 can estimate when congestion of LTE cell is likely to occur. PTT server 400 may also consider factors such as the time of day, historically busy hours, historic PTT traffic patterns, and other data traffic patterns to determine when the capacity of the LTE network is most likely to have problem (e.g., not able to support all client devices within the delay budget and/or QoS requirements). In addition, PTT server 400 is aware of the type of PTT calls attempted (e.g., One-to-One call, group call) and the overall PTT call activity across a PTT service cluster. Taking one or more of these factors (e.g., location of client devices, last reported MCS/TBS values, predicted MCS/TBS values, historically reported MCS/TBS values, estimate of congestion of LTE cell, time of the day, historically busy hours, historic PTT traffic patterns, other data traffic patterns, type of PTT calls attempted, and the overall PTT call activity) into account, PTT server 400 groups each of the PTT users (e.g., the PTT users communicating with the talker leg) into one of N user categories (e.g., User Category-1, . . . , User Category-N) based on their radio conditions and predicted TBS (which may be derived from the predicted MCS value and the TBS index, as described hereinafter with reference to FIGS. 6-10). In particular, instead of creating a different user category for each user, PTT server creates a few user categories and group the PTT users (e.g., the listeners of the talk leg) into the few user categories, in some embodiments. For example, user with predicted MCS values (e.g., MCS value predicted by MCS/TBS predictor 403 of PTT server 400) from 1 to 5 may be grouped into User Category-1, users with predicted MCS values (e.g., MCS value predicted by MCS/TBS predictor 403 of PTT server 400) from 6 to 10 may be grouped into User Category-2, and so on. Therefore, the number of user categories is smaller than the number of PTT users, in the illustrated embodiment. For example, tens of, hundreds of, or even more PTT users may be grouped into a few (e.g., 3 to 5) user categories.

Each user category has a different frame rate (e.g., number of media frames in a packet) that is determined for that specific user category, in some embodiments. To find the frame rate for a user category, the lowest predicted MCS value (e.g., lowest MCS level predicted by MCS/TBS Predictor 403) in that user category may be used to determine the number of media frames that are bundled into a packet (e.g., a RTP packet). The frame rate determined is then used as the frame rate for the users in that user category. Methods and algorithms for determining the number of media frames per packet based on the MCS value are described hereinafter with reference to FIGS. 6-10, details are not repeated here.

Based on the frame rate of each user category, the media frames in the temporary packet buffer 405 are bundled (aggregated) into packets (e.g., RTP packet) having the corresponding frame rate. For example, for User Category-1 with a first frame rate, the PTT server 400 bundles the de-bundled media frames in temporary packet buffer 405 into a first plurality of packets in accordance with the first frame rate. The first plurality of packets is sent to users in User Category-1. The same de-bundled media frames in temporary packet buffer 405 are bundled into a second plurality of packets in accordance with a second frame rate of User-Category-2, and the second plurality of packets are then sent to the users in User Category-2.

The UEs and PTT server 400 may support multiple codecs with different data rates. The UEs and the PTT server may use pre-assigned codec types, in some embodiments. In other embodiments, PTT server 400 may change codec type and may perform codec type conversion under certain circumstances. For example, when voice media frames are received from a PTT client that does not have the capability to adopt or change codec type based on radio conditions, then PTT server 400 may need to fall back to a new codec with lower data rate (e.g., AMBE 2.6 kbps codec) and determine the frame rate for the new codec type. As noted above, methods and algorithms for determining the frame rate per packet are described hereinafter with reference to FIGS. 6-10, details are not repeated here.

Figure 5:
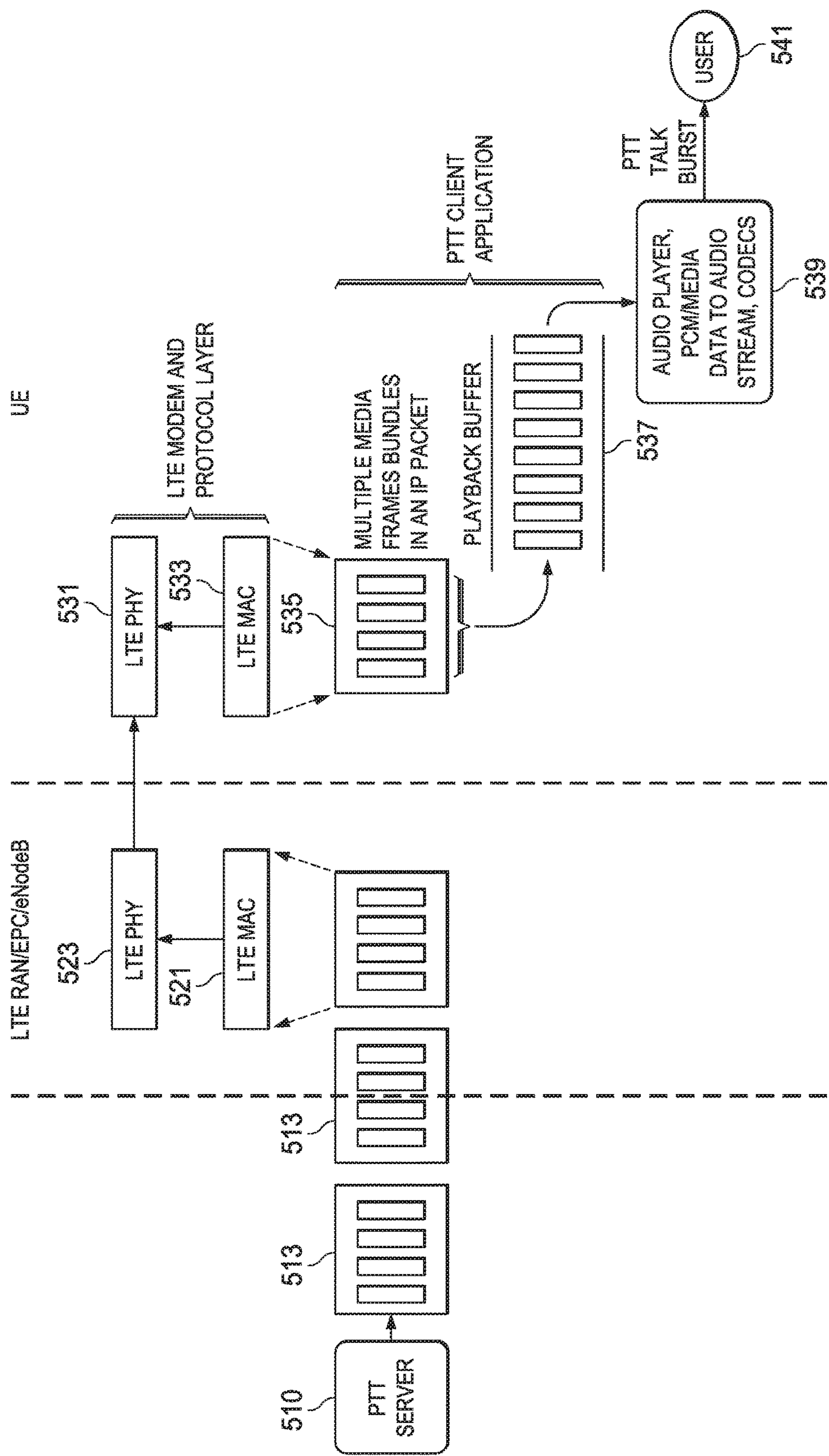
FIG. 5 illustrates a flow diagram of a method for downlink PTT media packet delivery, in some embodiments.

FIG. 5 is a flow diagram illustrating a method for downlink PTT media packet delivery according to some embodiments. PTT server 510 bundles a number of media frames into each packet 513 according to the radio conditions of the target UEs. In some embodiments, the number of media frames bundled into a packet, also referred to as packet bundling rate, is determined to increase the throughput of the PTT system. For example, the packet bundling rate may be chosen to utilize the complete LTE Transport Block Size (TBS), such that no padding, or minimal padding, is used in forming the packet. As another example, for good radio conditions (e.g., CQI value near 15), the PTT server 510 may attempt to utilize the full data capacity of a large TBS (e.g., TBS size from 712 bits to 14688 bits), and for bad radio conditions (e.g., CQI value near 1), the PTT server 510 may fit the media frames into a small TBS (e.g., TBS size from 16 bits to 536 bits).

Packets 513 with bundled media frames are sent from PTT server 510 to a base station such as a LTE RAN/Evolved Packet Core (EPC)/eNodeB, and are then transmitted by the base station to the UE. The base station sends packets 513 from MAC layer 521 to PhY layer 523 of the base station, which PhY layer 523 transmits packets 513 via the LTE air interface to the UE as modulated data signal. On the UE side, the modulated data signal are received by PhY layer 531 of the UE. After PhY layer processing such as demodulation and error correction coding, received packets 535 are available at MAC layer 533 of the UE. Next, the UE de-bundles the media frames from the received packets 535 and store the media frames in a playback buffer 537 for playback by, e.g., an audio player 539 to a user 541.

Figure 6:
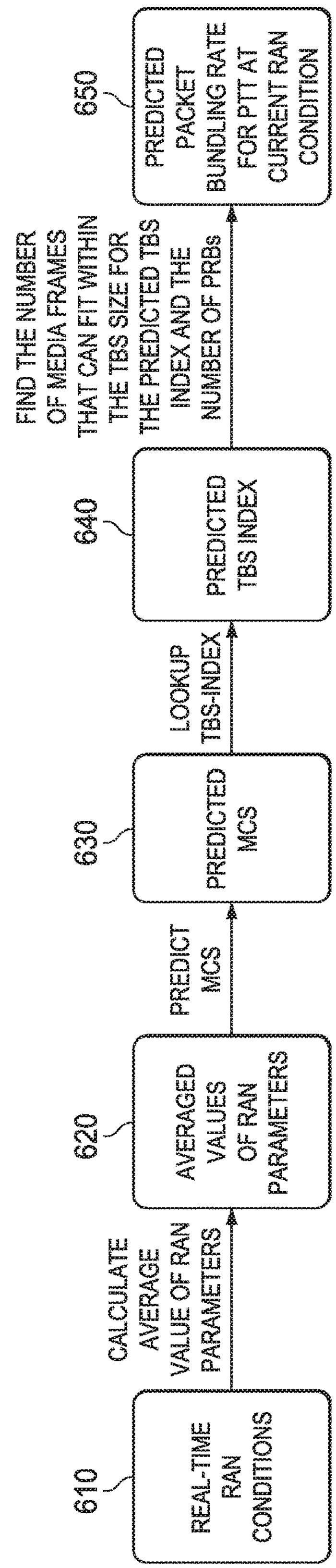
FIG. 6 illustrates a flow diagram of a method of calculating predicted packet bundling rate, in some embodiments.

FIG. 6 is a flow diagram illustrating a method of calculating the packet bundling rate for a UE in a PTT system, according to some embodiments. The illustrated method may be implemented as a PTT client algorithm of the PTT client application, in some embodiments. In other embodiments, at least portions of the algorithm (e.g., the determination of packet bundling rate based on predicted TBS index) may be implemented in the PTT server application. The PTT client algorithm is applied when a user participates in an active PTT call, for example, by originating or receiving a PTT call. In FIG. 6, each box represents a parameter obtained in a certain step of the method illustrated by FIG. 6, and the arrows indicate the actions performed to move from a first step to a second step following the first step.

Referring to FIG. 6, at step 610, real-time RAN conditions are obtained by the PTT client application (e.g., PTT client application 203 in FIG. 2). The PTT client application on the UE monitors the radio conditions by, e.g., polling or reading radio condition parameters such as RSSI, SINR, Reference Signal Received Power (RSRP), RSRQ, or the like, from Device OS/Platform Layer (e.g., Device OS 205 in FIG. 2). In some embodiments, the radio condition parameters may also include lower layer LTE information such as reported CQI and MCS allocated by the base station. To access CQI and MCS from the lower layer, the PTT client application may utilize special Application Program Interfaces (APIs) to read the CQI and the MCS from lower layers (e.g., communication module 207 of UE 200 in FIG. 2), which CQI and MCS may otherwise be unavailable to general data applications.

Based on the radio condition parameters, the UE may determine the TBS value that is likely to be allocated to the UE by the base station (e.g., eNodeB). Determining the likely TBS value may include determining the likely MCS to be allocated by the base station based on observed or calculated CQI and size of data to be received or sent. Additional factors such as QoS requirements and priority requirements may also be taken into account in determining the likely MCS. In some embodiments, smaller TBS (e.g., smaller than 712 bits for CQI value of 1) can be expected for lower CQIs, such as CQIs with values near 1. Lower rate codec may be used with lower packet bundling rate to fit media data into smaller packets. A minimum packet bundling rate may be set to prevent the packet bundling rate from going lower than a configurable limit (e.g., a configured minimum packet bundling rate threshold). For example, the minimum packet bundling rate threshold may be set at three media frames per packet. In some embodiments, a larger TBS (e.g., more than 14688 bits) can be expected for higher CQIs, such as CQIs with values nearing 15. A higher packet bundling rate is used to utilize complete data block in the TBS to: a) avoid possible waste of capacity because of padding, thus avoiding partial data blocks; and b) push the size of application level media packet to a larger size so that common IP/RTP and transport header overhead is reduced. A maximum packet bundling rate may be set according a configured limit, so that delay incurred due to bundling does not introduce delay that is detrimental to the service quality. For example, the maximum packet bundling rate may be set to prevent the packet bundling rate from going higher than a configurable limit (e.g., a configured maximum packet bundling rate threshold). In some embodiments, the maximum packet bundling rate threshold may be 15 media frames per packet. Details regarding determining MCS and TBS are discussed in more details hereinafter.

Still referring to FIG. 6, the RAN radio condition parameters in step 610 may be averaged using an averaging algorithm to obtain averaged values of RAN radio condition parameters at step 610. The averaging algorithm may use any suitable algorithm. In some embodiments, a rolling average algorithm is used which calculates an average using data in a time range from the most up-to-date data point to an earlier data point at a pre-determined time distance. For example, the rolling average may average over measured values (e.g., measured RSRQ values) taken over, e.g., the last 30 seconds, and the rolling average is calculated every 10 seconds. The rolling average may ignore anomalous data (e.g., spikes in data), or may assign smaller weights (or coefficients) to anomalous data when calculating the average. In another embodiment, the averaging algorithm calculates the average of a parameter using a liner combination of measured values of the parameter, and the averaging algorithm may assigns different weights to different measured values of the parameter used in the linear combination. For example, the most recent measured value may be given a higher weight, and the oldest measured value used in the calculation may be given a smaller weight. In the above example, the weight may decrease linearly from the highest weight to the lowest weight in the linear combination. As another example, the weight may decrease exponentially from the highest weight to the lowest weight in the linear combination.

The averaged values of the radio condition parameters at step 620 are used to predict the MCS. In some embodiments, the MCS value is predicted using an algorithm relating the MCS, RSSI and SINR. In other embodiments, the MCS value may be predicted using a table or other stored data that relates the RSSI, SINR, and MCS values. The table may be generated based on, e.g., field data by plotting the captured or predicted MCS values versus one or more radio condition parameters and finding the relation between the MCS values and the one or more radio condition parameters through observation, curve fitting, and/or regression analysis. In some embodiments, the MCS value is predicted using the rolling averages of RSSI and SINR, and are calculated periodically (e.g., every 10 s). In cases where the PTT client application has access to the CQI value allocated by the base station from lower layers, MCS may be determined by using a look-up table showing the mapping between CQI values and MCS values. Table 1 illustrates an example of mapping between CQI and MCS. In some embodiments, Table 1 is used to determine MCS from CQI.

TABLE 1

Mapping between CQI and MCS

| CQI | MCS | Modulation |
|---|---|---|
| 1 | 0 | QPSK |
| 2 | 0 | QPSK |
| 3 | 2 | QPSK |
| 4 | 5 | QPSK |
| 5 | 7 | QPSK |
| 6 | 9 | QPSK |
| 7 | 12 | 16QAM |
| 8 | 14 | 16QAM |
| 9 | 16 | 16QAM |
| 10 | 20 | 64QAM |
| 11 | 23 | 4QAM |
| 12 | 25 | 64QAM |
| 13 | 27 | 64QAM |
| 14 | 28 | 64QAM |
| 15 | 28 | 64QAM |

The predicted MCS value at step 630 is used to generate a predicted TBS index at step 640 using, for example, an MCS-to-TBS Index look-up table, such as Table 7.1.7.1-1 in 3GPP Specification 36.213. FIG. 7 shows Table 7.1.7.1-1 in 3GPP Specification 36.213. In some embodiments, the predicted MCS value at step 630 is used to look up a TBS index value from table 750 shown in FIG. 7.

The TBS index at step 640 is then used to predict the packet bundling rate 650 for the PTT system at the current RAN conditions. The predicted packet bundling rate, in some embodiments, is determined by finding the largest number of media frames that can fit within the TBS size. The TBS size is determined using the predicted TBS index and number of allowed PRBs. Therefore, the predicted packet bundling rate may be determined by performing the following steps: a) determine the TBS size for the predicted TBS index and number of allowed PRBs; b) calculate a plurality of predicted packet sizes (e.g., number of bits or number of bytes in a packet), where each predicted packet size is the size of the packet including the packet header(s) and all of the media frames that are bundled into the packet, and where each predicted packet size corresponds to a packet bundling rate within a configured range limit (e.g., between 3 frames/packet to 14 frames/packet); and c) from the plurality of predicted packet sizes, find the largest predicted packet size that could be accommodated by the TBS size, and the corresponding packet bundling rate is the predicted packet bundling rate.

The TBS size for various combinations of TBS indices and number of PRBs can be pre-calculated and tabulated into look-up tables. FIG. 8A and FIG. 8B shows portions of table 7.1.7.2.1-1 of 3GPP Specification 36.213, the full table is given in the 3GPP Specification 36.213. In the tables in FIG. 8A and FIG. 8B, TBS index is denoted by $I_{TBS}$, and the number of PRBs is denoted by $N_{PRB}$, and entries of the table shows the TBS size in number of bits. In some embodiments, the tables in FIG. 8A and FIG. 8B are used in determining the TBS size for various combinations of TBS indices and number of RPBs. For example, for $I_{TBS}$=2 and $N_{PRB}$=20, the TBS size is 872 bits.

Calculation of the predicted packet size for each packet bundling rate may be performed using known information such as the size of each media frame, size of the headers of each packet (e.g., IP header, UDP header, RTP header or Robust Header Compression (RoHC) header), and the range of packet bundling rates suitable for PTT application. For example, a range of 3 media frames/packet to 14 media frames/packet may be used for PTT systems.

The size of each media frame may be calculated by multiplying the media frame length (e.g., time span) with the data rate of the intended codec. For example, for media frames with a 20 ms frame length and an AMBE codec with a 2.6 kbps data rate, 52 bits or 6.5 bytes are generated in each media frame. The predicted packet size may be calculated by first multiplying the packet bundling rate with the size of each media frame, then adding the size of the headers. The predicted packet sizes may be calculated for all packet bundling rates within the configured range limit.

FIG. 9 is a table showing predicted packet sizes for packet bundling rate ranging from 4 to 14. In the example of FIG. 9, media frame is 20 ms long, and the data rate for the codec is 2.6 kbps. Sizes of various headers are also listed in FIG. 9. The packet size for different packet bundling rate are shown in number of bits and number of bytes, for two different header configurations (with and without RoHC header). The predicted packet sizes shown in FIG. 9 can be used with the TBS size (e.g., shown in FIG. 8A and FIG. 8B) to determine a predicted packet bundling rate that could be accommodated by the TBS size. The predicted packet bundling rate corresponds to the largest packet bundling rate that can be accommodated by the TBS size, in some embodiments. For the example above with $I_{TBS}$=2 and $N_{PRB}$=20 (TBS size=872 bits), and for a packet without RoHC header (e.g., a packet having RTP header, IP header and UDP header), FIG. 9 shows that a packet bundling rate of 8 corresponds to the largest predicted packet size (e.g., 832) that can fit into the TBS size of 872, thus the predicted packet bundling rate is 8 for a packet without RoHC header. As another example, for a packet with RoHC header (e.g., a packet having RTP header and RoHC header), the largest predicted packet size is 840 for a packet bundling rate of 15, thus the predicted packet bundling rate is 14 for a packet with RoHC header.

In an LTE cellular network, the UEs report CQI values to eNodeBs. The eNodeBs determine the MCS and the corresponding TBS values based on various RAN radio conditions and metrics, such as CQI reported by UEs, size of downlink or uplink data blocks, overall interference levels across the cell, cell level information (e.g., overall spectral efficiency, overall energy efficiency), and QoS profile, as examples. Although CQI is an important radio condition parameter in determining the MCS, the PTT server application does not communicate with the eNodeB regarding the CQI values, in some embodiments. PTT client application, although running on the OS of the UE, may not have access to the CQI values from the lower layers of the UE (e.g. communication modules 207 in FIG. 2). For example, the APIs of the Android OS may only provide RSRQ values to the PTT client application. Therefore, to increase the PTT client capacity, it may be advantageous to develop algorithms that could predict CQI and the corresponding MCS value using limited radio condition information (e.g., RSRQ) available to the PTT system. Such an algorithm is illustrated in FIG. 10.

Figure 10:
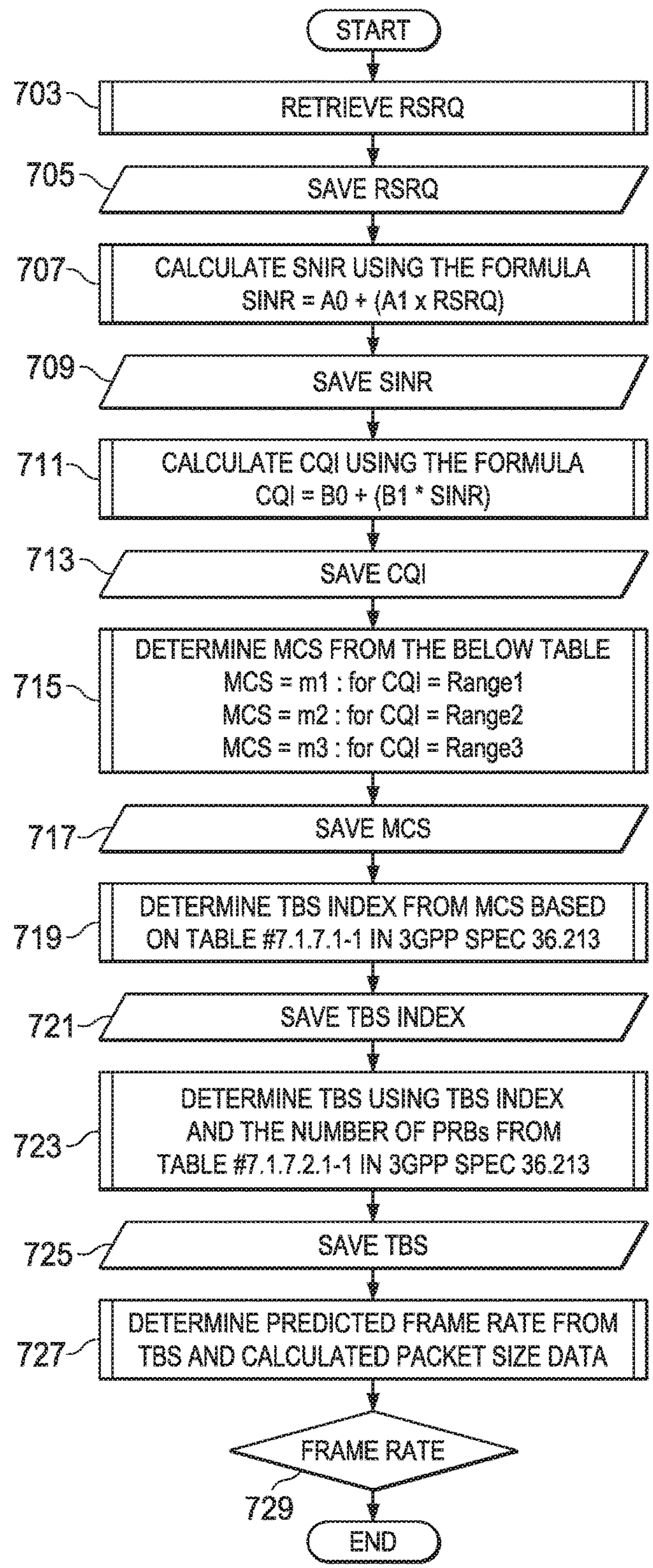
FIG. 10 illustrates a flow chart of a method for determining the number of media frames in a packet based on the Reference Signal Received Quality (RSRQ) radio condition parameter, in some embodiments.

FIG. 10 illustrates a flow chart for an algorithm to predict the CQI value and the MCS value from the RSRQ value, and to determine the predicted packet bundling rate. The algorithm illustrated by FIG. 10 may be implemented in the PTT client application. At least portions (e.g., step 717 to step 729) of the algorithm in FIG. 10 may also be implemented in the PTT server application.

Referring to FIG. 10, at step 703, the RSRQ is retrieved from, e.g., an API of the OS of the UE. The retrieved RSRQ values is saved in, e.g., a memory area of the UE at step 705. Next, the RSRQ value is used in a linear equation $$\mathrm{SINR}=A0+A1\times\mathrm{RSRQ} \tag{1}$$

to calculate an estimated or predicted value of SINR, where A0 and A1 are coefficients of the linear equation. The predicted value of SINR is saved at step 709, and used in another linear equation $$\mathrm{CQI}=B0+B1\times\mathrm{SINR} \tag{2}$$

to calculate an estimated or predicted values of CQI, where B0 and B1 are coefficients of the linear equation. Coefficients A0, A1, B0, and B1 may be generated by analyzing vast amount of field data collected. In some embodiments, regression analysis is used in analyzing the field data. The field data collected may include RSRP, RSRQ, RSSNR, RSSI, Signal Strength measured on UE, CQI, MCS, TBS, and number of PRBs, as examples. Linear regression analysis is used to extract the relation between RSRQ and SINR, and to extract the relation between SINR and CQI, in some embodiments. Since both equation (i) and equation (2) are linear equations, equation (i) and (2) may be combined into one linear equation CQI=C0+C1×RSRQ to calculate CQI from RSRQ, where C0=B0+B1×A0, and C1=B1×A1. In the illustrated embodiment, the calculation of the estimated or predicted CQI uses less radio condition parameters than the calculation of CQI by the lower layer of the client device (e.g., communication module 207 in FIG. 2). For example, the algorithm illustrated in FIG. 10 uses one radio condition parameter RSRQ to calculate the estimated or predicted CQI. In contrast, the lower layer of the client device may use multiple radio conditions parameters, such as SNR, SINR, and Signal-to-Noise plus Distortion Ratio (SNDR), in the calculation of the estimated or predicted CQI.

Coefficients A0, A1, B0, and B1 may be saved in a memory area (e.g., program memory) of the UE and used as constant coefficients in equations (1) and (2). However, the PTT server may update the values of A0, A1, B0 and B1, e.g., periodically, through appropriate downlink channel. The updated values of the coefficients may be based on, e.g., additional field data analysis. In some embodiments, it may be advantageous to customize the coefficients (e.g., A0, A1, B0, and B1) for a specific geological area using field data captured in that geological area. As UE travels to a new area (e.g., being registered to a base station in a different city), it might be advantageous for the PTT server to update the coefficients (e.g., A0, A1, B0, and B1) of the UE, such that the UE can use coefficients customized for the new area to generate more accurate predicted values using equations (1) and (2).

Still referring to FIG. 10, at step 715, based on the predicted CQI, MCS is determined using the look-up table illustrated in step 715 of FIG. 10. The look-up table includes three ranges for the values of CQI, with each range corresponding to an MCS level. When the predicted CQI value falls within one of the ranges (e.g., Range 1), the corresponding MCS value (e.g., m1) is chosen as the predicted MCS. The look-up table in step 715 is generated by analyzing the relation between MCS and CQI using captured field data, in some embodiments. For example, scatter chart of the MCS vs. CQI may be used to derive the look-up table in step 715. In an embodiment, Range 1 includes CQI values from 1 to 4, Range 2 includes CQI values from 5 to 6, and Range 3 includes CQI values from 7 to 15. The corresponding MCS values for Range 1, Range 2 and Range 3 are 0, 6, and 12, respectively, in the illustrated embodiment. Although three ranges are used in the example of FIG. 10, more or less than three ranges may be used in mapping CQI to MCS. In addition, other regression analysis using linear regression or non-linear regression may be used to derive the relation between CQI and MCS using field data.

The MCS value determined at step 715 is saved at step 717, and the MCS values is used to determine the TBS index using table 750 illustrated in FIG. 7. After saving the TBS index at step 721, the TBS index and the number of PRBs (e.g., a maximum number of PRBs for a specific carrier bandwidth, or a number of PRBs determined by the PTT system based on call delay budget) are used to determine TBS size using, e.g., the tables in FIGS. 8A and 8B. The tables in FIGS. 8A and 8B show TBS sizes for number of PRBs up to 20, which may be used as an upper limit for the number of PRBs used in a PTT system. When the max number of PRBs increases beyond 20, the corresponding transport block size may not be efficient for transmission. This is because LTE network or UE needs to retransmit the packet on errors or packet loss, therefore, the bigger the transport block, the higher is the overhead of retransmission. In other embodiments, number of PRBs larger than 20 may be used, in which case Table 7.1.7.2.1-1 of 3GPP Specification 36.213 may be used to determine the TBS size.

Next, TBS size is saved at step 725, and the predicted frame rate is determined at step 727, and subsequently, the predicted frame date is saved at step 729. The processing in step 723 and step 725 are similar to that for determining the predicted packet bundling rate 650 discussed above with reference to FIG. 6. For example, step 727 involves calculating a plurality of packet sizes based on a range of frame rates, and finding the largest packet size that can be accommodated by the TBS. The corresponding frame rate of the largest packet size that can be accommodated by the TBS may be used as the predicted frame rate. Note that in the illustrated embodiments, frame rate and packet bundling rate have the same value (e.g., a frame rate of 8 corresponds to a packet bundling rate of 8 media frames/packet).

Figure 11:
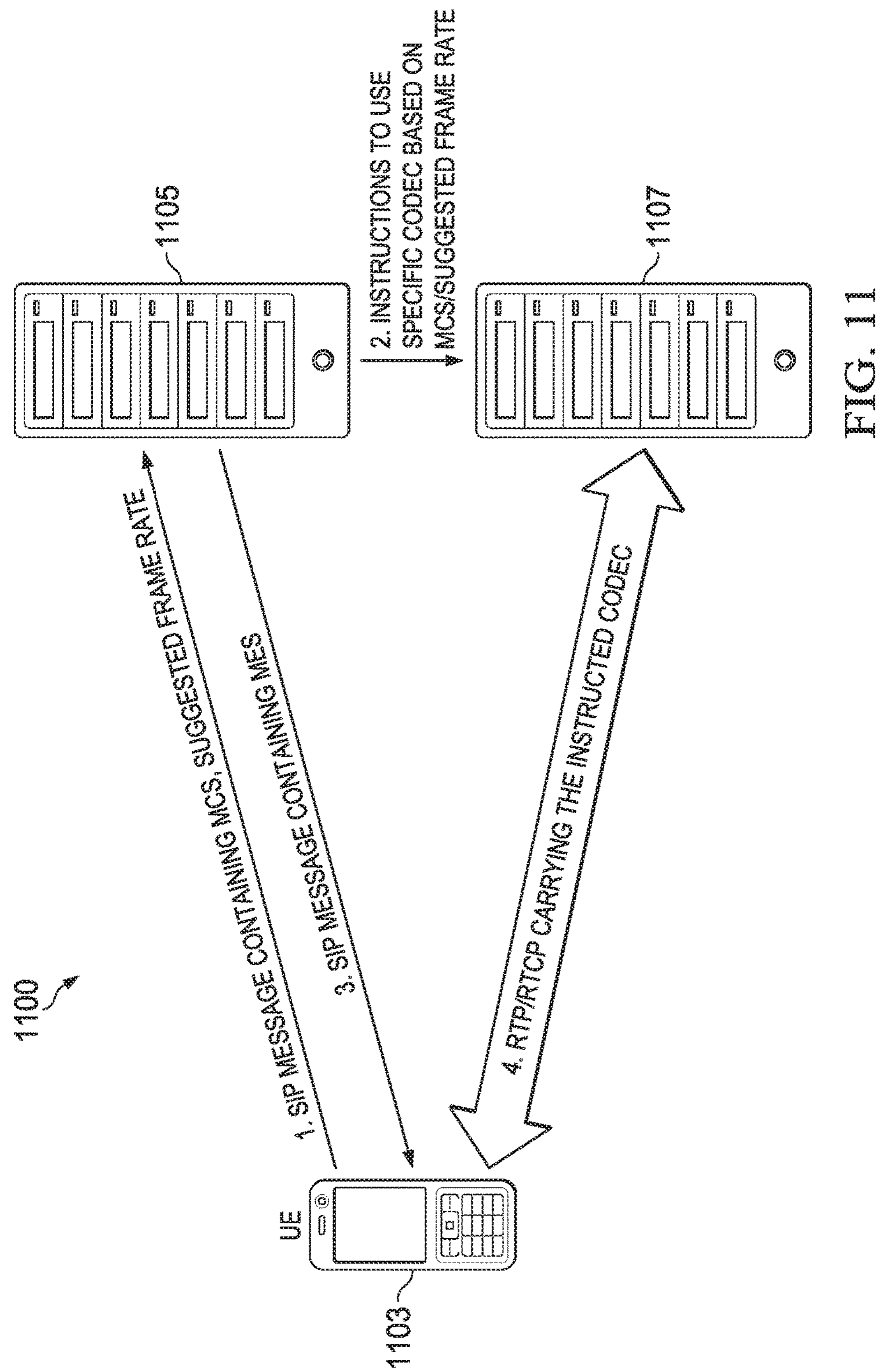
FIG. 11 illustrates the exchange of signaling messages and data packets in a PTT system, in some embodiments.

FIG. 11 illustrates a PTT network 1100 in accordance with an embodiment of the present disclosure. As illustrated in FIG. 11, PTT network 1100 has a UE 1103, a first PTT server 1105 of PTT network 1100, and a second server 1107 of PTT network 1100. For example, in a Push-to-talk over cellular (PoC) network, the first PTT server 1105 may be the PoC server of the PoC network, and the second server 1107 may be the media server of the PoC network. The first server 1105 and the second server 1107 may be two different computers, each with respective software applications running on the computer. However, the first server 1105 and the second server 1107 may also be implemented on one computer, with the computer running different applications to implement the functionalities of the first server 1105 and functionalities of the second server 1107. The first server 1105 and the second server 1107 may be collectively referred to as a PTT network server, or a PTT server.

Operation of PTT system 1100 is described with reference to FIG. 11. Discussion of FIG. 11 below uses a PoC network having a first server (e.g., a PoC server) 1105 and a second server (e.g., a media server) 1107 as an example of PTT system 1100, with the understanding that other types of PTT networks may also be used. In FIG. 11, UE 1103 sends a first signaling message to PoC server 1105. The first signaling message contains a first MCS and a first frame rate. The first MCS may be a predicted MCS calculated by the UE (e.g., the predicted MCS 630 in FIG. 6). The first frame rate may be a predicted frame rate calculated by the UE, such as the predicted frame rate 729 in FIG. 10. After receiving the first signaling message from UE 1103, PoC server 1105, based on various factors (e.g., location of the UE, UE reported MCS/TBS values, predicted MCS/TBS values, historically reported MCS/TBS values, estimate of congestion of LTE cell, time of the day, typically busy hours, typical PTT traffic patterns, other data traffic patterns, type of PTT calls attempted, and the overall PTT call activity), determines a second MCS (e.g., a predicted MCS for UE 1103) and a second frame rate to use for data transmission/reception. The second MCS and the second frame rate are determined such that: a) the second MCS and the second frame rate could be accommodated by the predicted radio conditions; and b) a maximum number of UEs could be supported simultaneously by the PTT system, in accordance with an embodiment. In some embodiments, the second MCS and the second frame rate are the same as the first MCS and the first frame rate, respectively. In addition, PTT server (e.g., PoC server 1105) may determine the codec (e.g., AMBE codec) and the code rate (e.g., 2.6 kbps) for the codec to be used for data transmission/reception. In the discussion hereinafter, the second MCS, the second frame rate, the codec and the code rate for the codec may be referred to as the parameters of the Media Encoding Scheme (MES). In some embodiments, the PTT server (e.g., PoC server 1105) determines parameters of the MES based on various factors such as predicted MCS level, overall PTT user density in the target user's cell, the type of PTT call (e.g., one-to-one, group call, broadcast call), and Service Qualify constraints (e.g., Mean Opinion Score (MoS) requirements).

Next, PoC server 1105 sends a notification to media server 1107 regarding the second MCS, the second frame rate, the codec and the code rate. Media server 1107 implements the User Plane (e.g., bearer traffic handling) aspect of the PTT service. Media server 1107 supports controlling PTT function for PTT service by duplicating the talk bursts received from originator PTT client to all recipients of the PTT Session, in some embodiments. Media server 1107 also supports participating PTT function for PTT service by relaying the talk bursts between PTT clients and the media server supporting the controlling PTT function, in some embodiments. Media server 1107 may also handle Media Burst Control Protocol (MBCP) packets sent to and received from the PTT clients for floor control during PTT sessions.

Additionally, PoC server 1105 also sends a second singling message containing the MES information to UE 1103. In some embodiments, the MES information are sent to UE 1103 by sending an index of a pre-determined table (e.g., a pre-determined configuration table known to both the UE and the PTT server) from the PTT server to the UE, where each index corresponds to a set of pre-determined parameters for MES. In other embodiments, MES parameters are provided in a header (e.g., a Kpoc Header of an SIP message) of a signaling message sent from the PTT server to the UE. The PTT server is aware of the UE's capability, therefore, the MES parameters sent to the UE could be supported by the UE, thus no MES negotiation is needed during PTT calls, in some embodiments. Thereafter, UE 1103 and media server 1107 may start transmitting or receiving data in accordance with the MES parameters, e.g., using the second frame rate, the selected codec and the selected code rate. The data transmission and reception may be performed using the RTP/RTCP (RTP Control Protocol) protocol.

Figure 12:
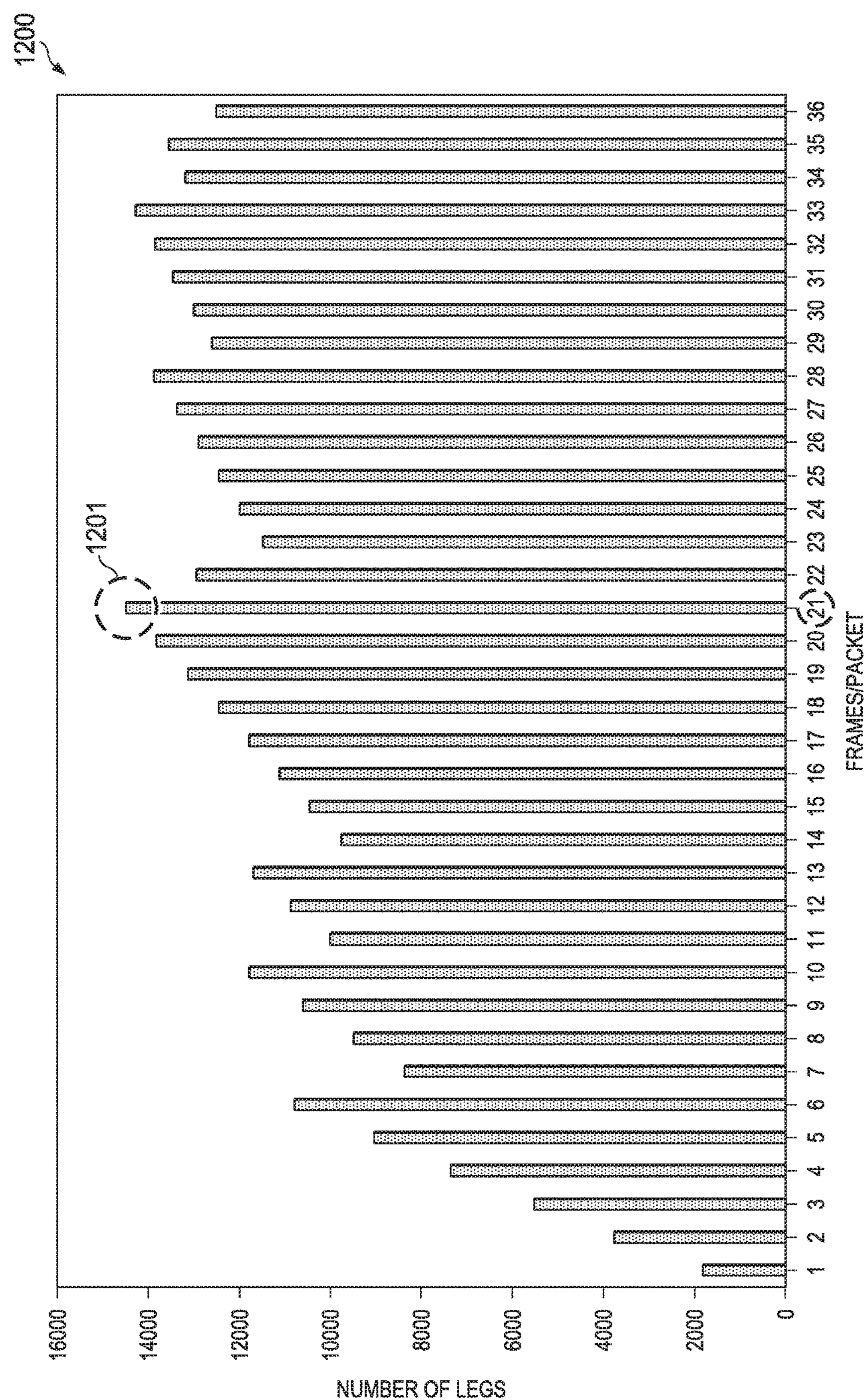
FIGS. 12-14 illustrate the PTT capacity versus packet bundling rate for various PTT calls, in some embodiments.
Figure 13:
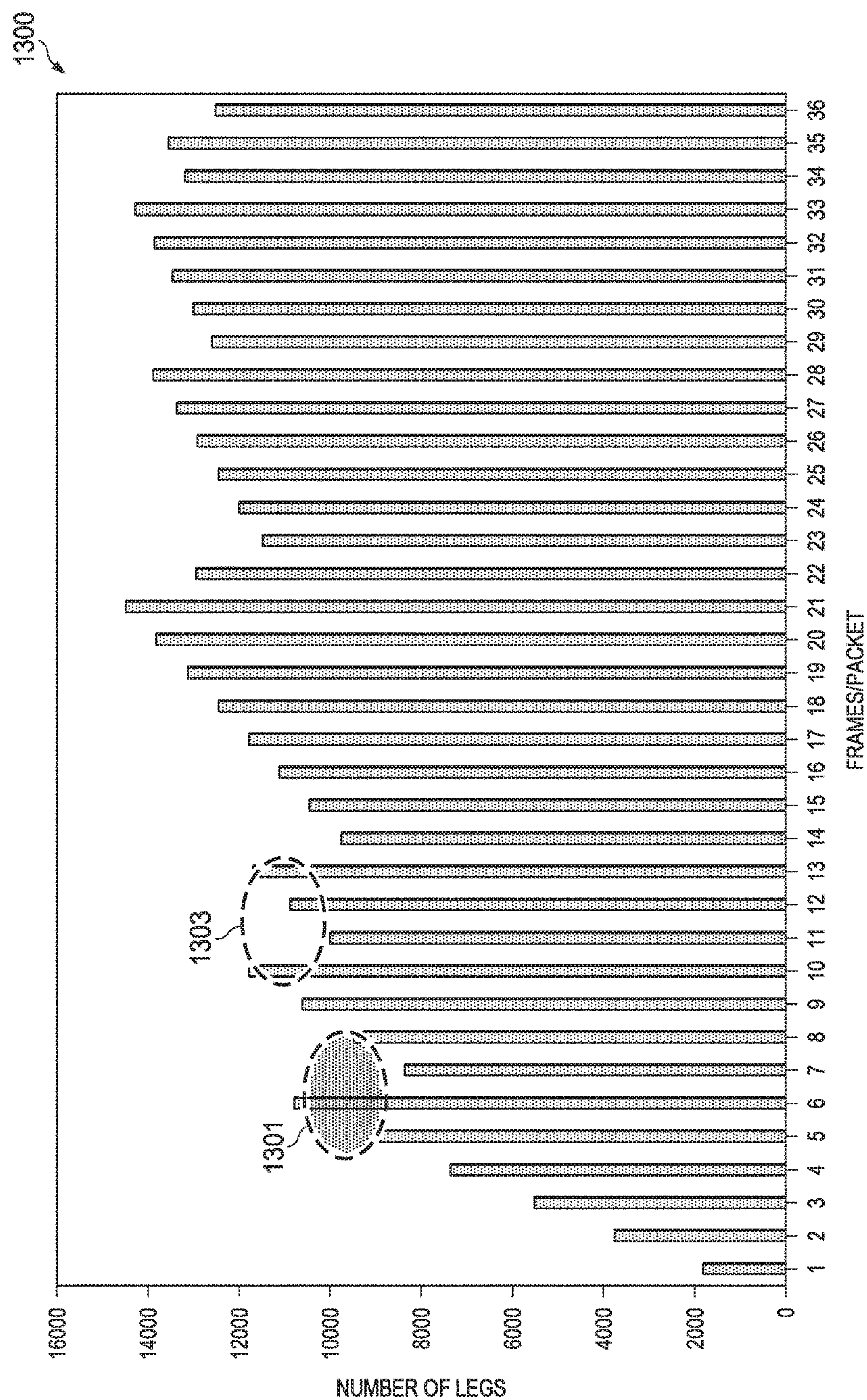
Figure 14:
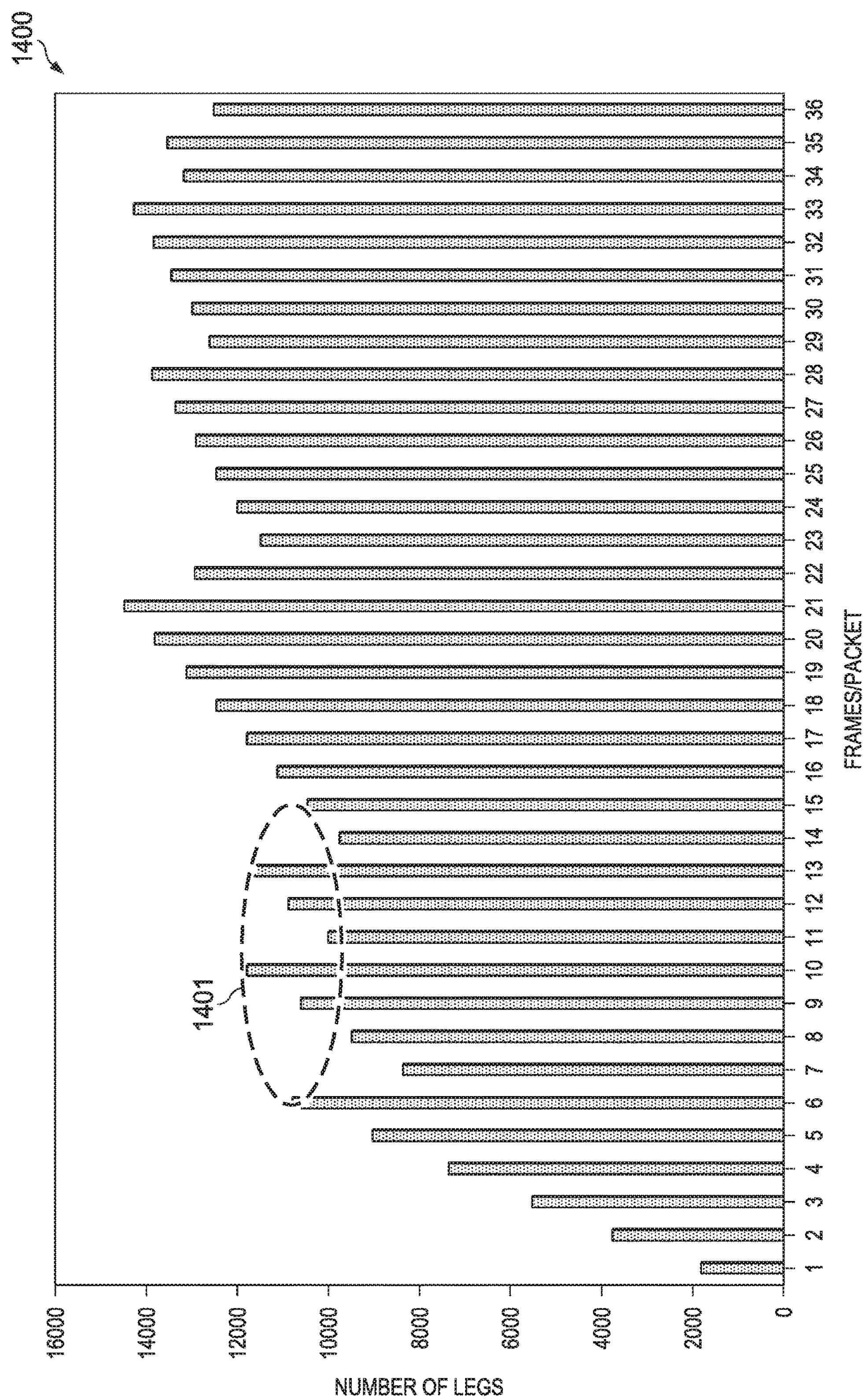
Figure 15:
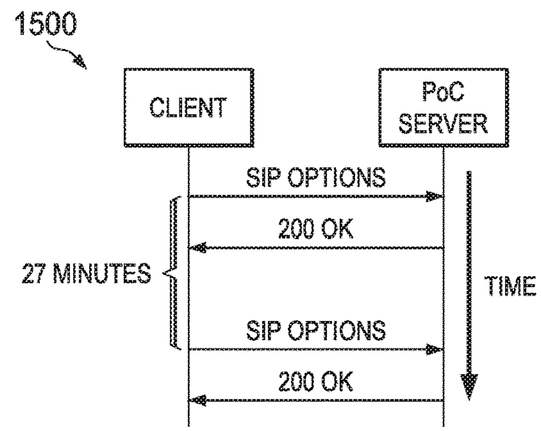
FIGS. 15-18 illustrate various PTT call flow control, in some embodiments.

FIGS. 12 through 15 illustrate the PTT capacity versus packet bundling rate for various PTT calls (e.g., PTT group call, PTT broadcast call, PTT one-to-one call). FIG. 12 illustrates a diagram 1200 showing the PTT capacity versus packet bundling rate for PTT broadcast calls. For PTT broadcast calls, the primary focus is to maximize the simultaneous number of call deliveries. Since the broadcast call is a one-way large group call, voice latency is less of concern. In the example of FIG. 15, an AMBE codec with a data rate of 2.6 kbps is used for a CQI value of 9.4, and the largest PTT capacity is achieved with a packet bundling rate of 21 frames/packet (see label 1201).

FIG. 13 illustrates a diagram 1300 showing the PTT capacity versus packet bundling rate for PTT group calls. For PTT group calls, the primary focus is to maximize simultaneous number of call deliveries within a voice delay budget. In the example of FIG. 13, the codec used is the AMBE 2.6 kbps codec, CQI value is 9.4, and calculated predicted packet bundling rate is applied after the first volley. In the first volley, call setup overheads should be considered to meet the requirement of sub-second call setup time, therefore, packet bundling rates of 5 to 8 frames/packet (see label 1301) provide a good balance between increasing PTT capacity and reducing call setup delay. In subsequent volleys, packet bundling rates in the range of 10 to 13 frames/packet (see label 1303) may provide the largest PTT capacity when the upper boundary for frame rate is set at 15. Frame rates larger than 15 may degrade user experience. For example, there is a long delay associated with the waiting and assembling of large numbers (e.g., larger than 15) of media frames into a packet. As another example, when a packet having a large number of media frames (e.g., 21 media frames) gets corrupted or lost (e.g., due to bad channel condition), the amount of data lost may correspond to a long period (e.g., almost half a second worth of data for a frame rate of 21) of time, thus may seriously degrade user experience. Therefore, a frame rate of 15 may be used as an upper boundary for the selection of frame rate in group calls. In some embodiments, inter-Volley duration is utilized to normalize receiving buffer in PTT group calls. Additionally, in some embodiments, heuristic uplink optimization is used for floor control signaling.

FIG. 14 illustrates a diagram 1400 showing the PTT capacity versus packet bundling rate for one-to-one PTT call. For one-to-one PTT calls, The primary focus is to maximize the simultaneous number of one-to-one call deliveries within voice delay budget. In the example of FIG. 14, the codec used is an AMBE 2.6 kbps codec, CQI value is 9.4, and an upper boundary for frame rate is set at 15. Predicted frame rate is calculated based on heuristics such as: a) overall PTT call density in a given cell; and b) RF quality/noise conditions at user location. As illustrated in FIG. 14, packet bundling rates in the range from 6 to 15 frames/packet (see label 1401) may provide the largest PTT capacity.

FIGS. 15-18 illustrates the exchange of the MCS and frame rate (either calculated by the UE or modified by the PTT server) between the UE and the PTT server in PTT call flows. In some embodiments, the MCS and frame rate are transmitted between the UE and PTT server using the existing SIP signaling messages. Alternatively, the MCS and frame rate may be transmitted using: 1) MBCP; 2) HTTP; or 3) Mobile Data Sync mechanisms over UDP, TCP, or SCTP transports.

To transmit the MCS and frame rate in SIP signaling messages, a new SIP Extension Header, which is an SIP header with MCS and frame rate appended thereto, may be used as a first option. The MCS and the frame rate may also be referred to as the Private LTE (PLTE) RAN parameters in the context of SIP messaging. The new SIP Extension Header may be supported in the following SIP messages: the SIP REFER message, the SIP OPTIONS message, the SIP INFO message and the SIP INVITE message. Note that in order to use the new SIP Extension Header, the new SIP Extension Header may need to be registered with the Internet Engineering Task Force (IETF) as a Request for Comments (RFC) or draft. As a second option, the MCS and frame rate may be carried in a proprietary header.

After receiving a SIP signaling message with an Extension Header, the PTT server should send a response by returning the same Extension Header in the next available SIP Message/Response with the same values for MCS and frame rate, or with different values for MCS and frame rate that the client should use for the transmission/reception of the data, in some embodiments. The PTT server stores the latest received PLTE parameters of every client, in some embodiments. In the illustrated embodiments, every call setup request is expected to contain PLTE parameters from the originating client. If the PLTE parameters are not received in an SIP REFER message, the PTT server should use the last (e.g., most recent) stored values of the PLTE parameters. In addition, if the PTT server receives new MCS and frame rate values during the call, the PTT server may decide to upgrade the transmission/reception of the media data accordingly. However, considering the short duration of the average PTT calls (e.g., typically 45 seconds), the PTT server may decide to use the PLTE parameters determined at the beginning of the call to finish the on-going PTT call.

In FIGS. 15-18, a PoC network having a PoC server and a media server is used an example of a PTT network, with the understanding that other types of PTT network may also be used. As illustrated in FIGS. 18-21, the MCS and the frame rate parameters are included in the Kpoc header of an SIP message. In particular, for PTT calls, the UE includes the MCS and the frame rate in the Kpoc header of the SIP REFER message (for pre-established sessions) or the SIP INVITE message (for ad-hoc calls). For data collection by the PTT server, the UE includes the MCS and the frame rate in the Kpoc header of the SIP INVITE message (for pre-established sessions), the SIP REGISTER message, or the SIP OPTIONS message.

FIG. 15 illustrates the transmission of the PTT optimization parameters during the IDLE period of the client. As is customary in a call flow diagram, the direction from the top of a call flow diagram to the bottom of the call flow diagram (see direction labeled "time") denotes the progression of time, and the arrowed lines (single direction or bi-directional) between the client(s) and the PTT server (e.g., PoC sever, media sever) denote the exchange of messages (e.g., signaling messages or data messages carrying voice data) in the pointed directions of the arrowed lines.

During IDLE period, the client sends an SIP OPTIONS message periodically, e.g., every 27 minutes. The MCS (mcs) and the frame rate (fr) parameters are included in the SIP OPTIONS messages. The extended Kpoc header below with the PLTE parameters is added in the SIP OPTIONS messages.

Kpoc: <other params>;mcs=<val>;fr=<val>

When the PoC server receives the Mcs/FrameRate parameters, the PoC server sends an acknowledgment message (e.g., 200 OK in FIG. 18) as a response. The acknowledgment includes values for the MCS and the frame rate that the PoC server wants the client to use for the PTT call. In some embodiment, the MCS and the frame rate in the acknowledged message are the same as the MCS and the frame rate in the SIP OPTIONS message. In other embodiments, the PoC server may choose different values for the MCS and the frame rate. In cases where the Poc Server chooses different values for the MCS and the frame rate, the acknowledge message may further include the selected codec and the code rate for the selected codec.

Figure 16:
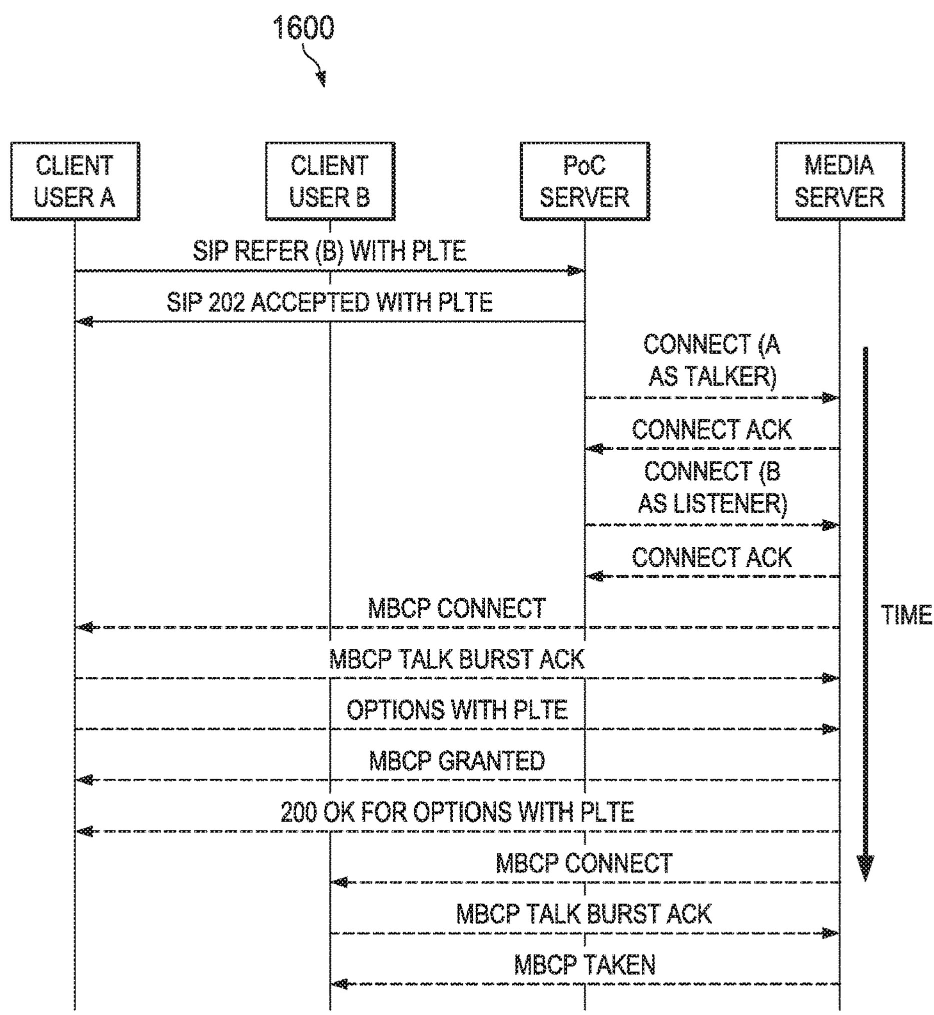

FIG. 16 illustrates the transmission of the PTT optimization parameters during a PoC call. On the originating side, the MCS and the frame rate parameters are provide from the client to the PoC server in an SIP REFER message. The below Kpoc header with the PLTE parameters is added in the SIP messages.

Kpoc: <other params>;mcs=<val>;fr=<val>

On the terminating side, once the MBCP Connect message is received, client can send the MCS and the frame rate parameters to the PTT server using a new SIP OPTIONS message with the MCS and the frame rate parameters, or using an MBCP Talk Burst Ack message if possible.

In FIG. 6, User A initiates the call session by sending an SIP PREFER message with PLTE parameters to the PoC server, and PoC server acknowledges with an SIP 202 Accepted message with PLTE parameters. The PoC server then notifies the media server that User A is the talker and User B is the listener. Next, the media server sends an MBCP Connect message to User A to establish connection with User A, and User A responds with MBCP Talk Bust Ack message, followed by an Options message with PLTE parameters. Media server grants the floor to User A by sending an MBCP Granted message to User A, followed by a 200 OK for Options message with PLTE parameters to User A. Next, the media server establishes connection with User B by sending an MBCP Connect message, to which User B responds with an MBCP Talk Bust Ack message. The media server then sends a MBCP Taken message to User B to notify User B that the floor has been taken.

Figure 17:
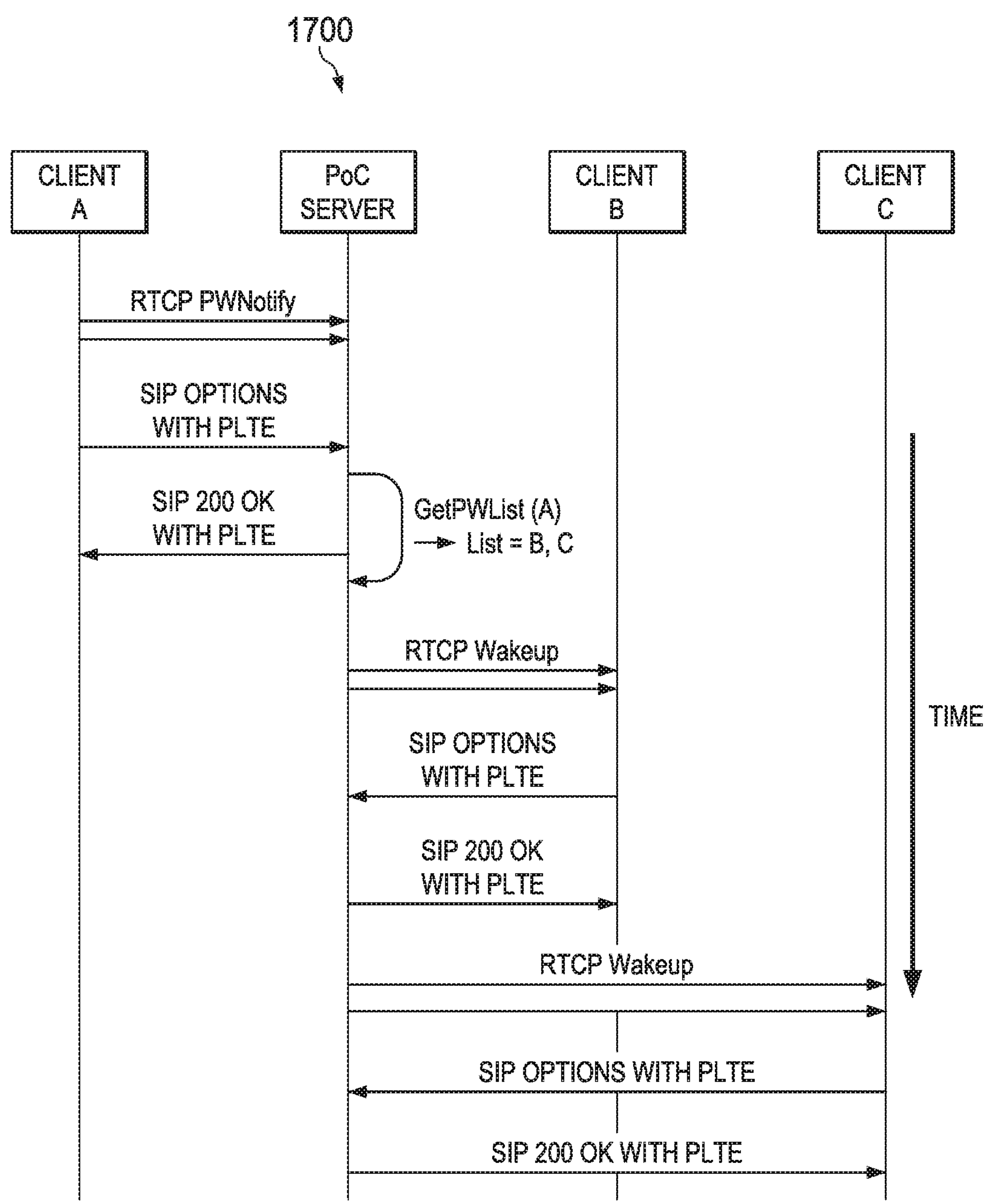

FIG. 17 illustrates the transmission of the PLTE parameters during an predictive wakeup call (e.g., as described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference). During predictive wakeup call session, the originating client sends out an SIP OPTIONS message with the PLTE parameters after the RTCP Predictive Wakeup message is sent out. The below Kpoc header with the PLTE parameters is added in the SIP messages.

Kpoc: <other params>;mcs=<val>;fr=<val>

At the terminating client, once the RTCP Predictive Wakeup message has been received, the client can send its PLTE parameters with the SIP OPTIONS message to the PoC server.

As illustrated in the example of FIG. 17, during a Predictive Wakeup call, Client A sends a RTCP Predictive Wakeup Notification message (RTCP PWNotify) to the PoC server, followed by an SIP Options message with PLTE parameters. The PoC server gets a predictive wakeup list (e.g., a list showing Client B and Client C as the predicted clients that Client A is going to call) using, e.g., recent call history, and sends an acknowledge message (SIP 200 OK) with PLTE parameters to Client A. The PoC server then wakes up Client B by sending an RTCP Wakeup message to Client B, and Client B responds by sending an SIP Options message with PLTE parameters to the PoC server. Next, the PoC server acknowledges with an SIP 200 OK message with PLTE parameters. Similar procedures are followed to wake up Client C.

Figure 18:
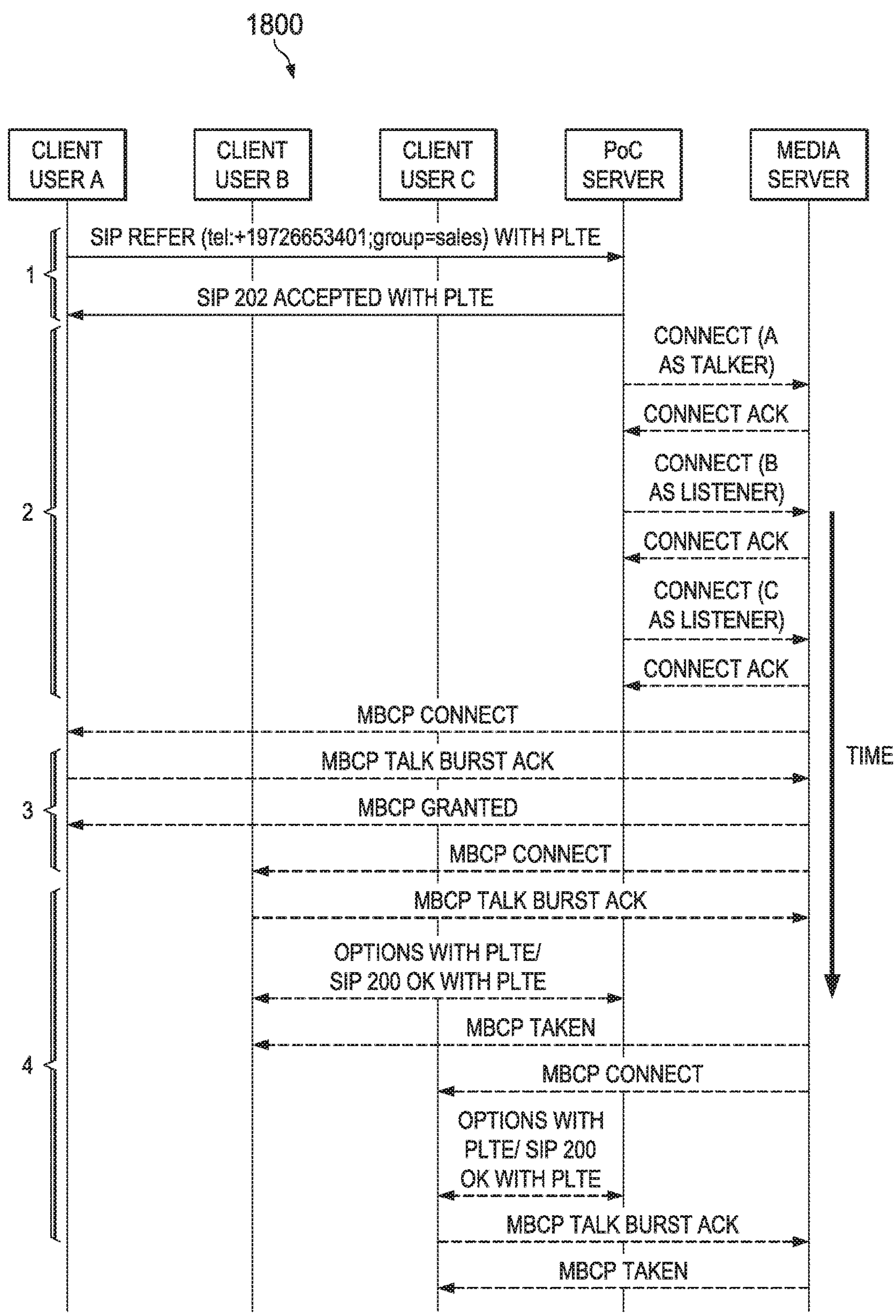

FIG. 18 illustrates the transmission of the PLTE parameters during a PoC group call. During a PoC group call, the originating client will send the PLTE parameters in an SIP REFER message to the PoC server. The below Kpoc header with the PLTE parameters is added in the SIP messages.

Kpoc: <other params>;mcs=<val>;fr=<val>

All the terminating clients, after receiving the MBCP Connect message, will send out SIP OPTIONS with the PLTE parameters to the PoC server.

In the example of FIG. 18, during a PoC group call, the originating client sends the PLTE parameters in an SIP REFER message to the PoC server, and the PoC server acknowledges with an SIP 200 Accepted message with PLTE parameters. The PoC server then notifies the media server that Client A is the talker, and Client B and Client C are the listeners. The media server then connects with Client A by sending an MBCP Connect message. After receiving an MBCP Talk Burst Ack message from Client A, the Media server grants the floor to Client A by sending an MBCP Granted message. Next, the media server connects Client B by sending an MBCP Connect message to Client B. Client B responds with a MBCP Talk Burst Ack knowledge, followed by an OPTIONS message with PLTE parameters to the PoC sever, or an SIP 200 OK message with PLTE parameters to the PoC server. The media server then sends a MBCP Taken message to notify Client B that the floor has been taken. Client C is connected following a similar procedure as Client B.

FIG. 19 shows an example of an SIP INVITE message with an extended Kpoc header 1903. In the example of FIG. 19, the extended Kpoc header includes an MCS value of 12, and a frame rate value of 14.

Figures 20, 21:
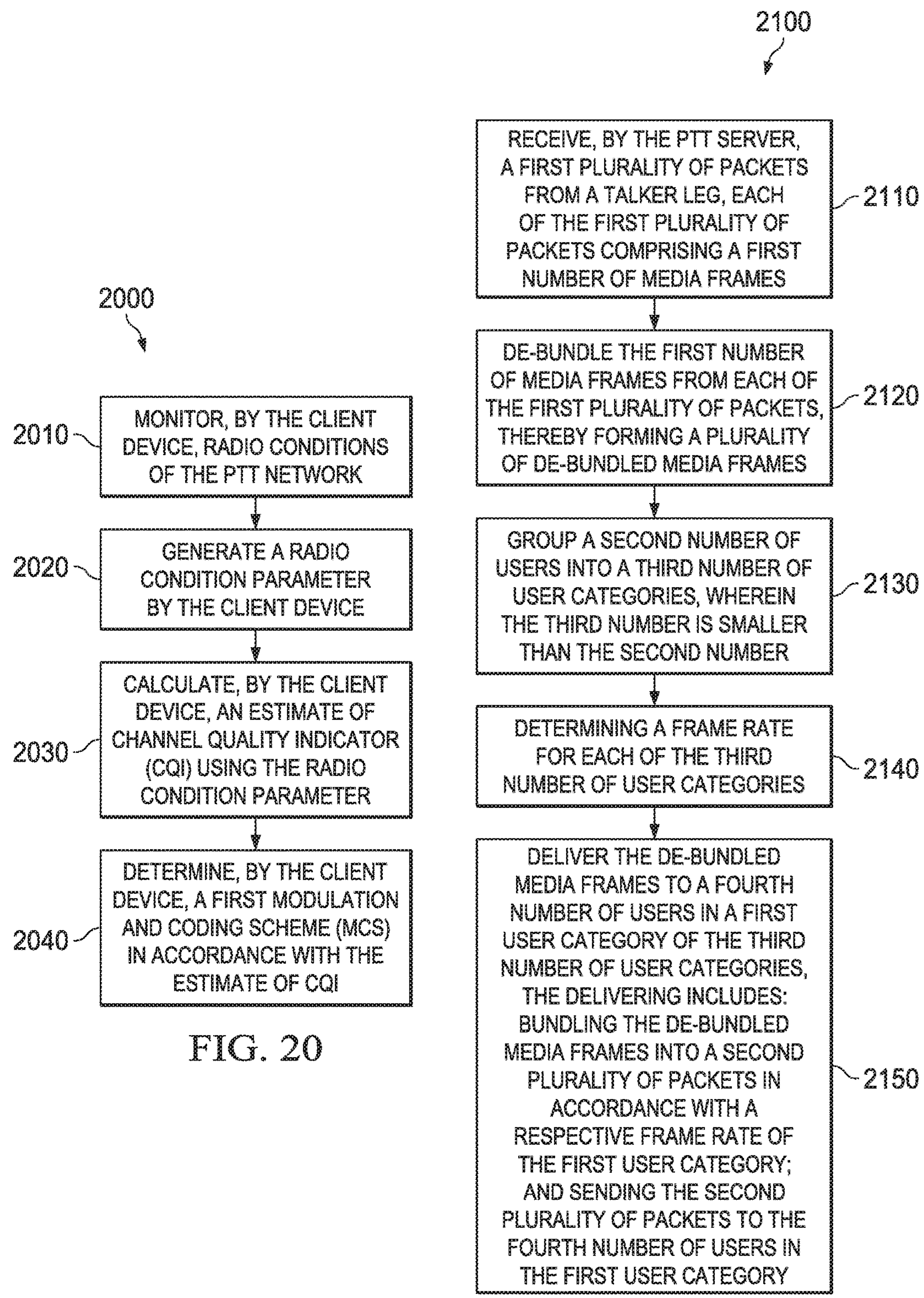
FIG. 20 is a flow diagram of a method of operating a client device in a PTT network, in some embodiments.
FIG. 21 is a flow diagram of a method of operating a UE in a PTT system, in some embodiments.

FIG. 20 illustrates a flow charts of a method of operating a client device in a PTT network, in accordance with some embodiments. FIG. 21 illustrates a flow charts of a method of operating a PTT server, in accordance with some embodiments. It should be understood that the embodiment method shown in FIGS. 20 and 21 are an examples of many possible embodiment methods. One of ordinary skill in the art would recognize many variations, alternatives, and modifications. For example, various steps as illustrated in FIGS. 20 and 21 may be added, removed, replaced, rearranged and repeated.

Referring to FIG. 20, at step 201, the client device monitors radio conditions of the PTT network. Monitoring radio conditions may include monitoring the RF channel conditions and may involve calculating various radio condition parameters, such as Reference Signal Received Quality (RSRQ), Received Signal Strength Indicator (RSSI), Signal Strength, and the like. At step 2020, the client device generates a radio condition parameter. The radio condition parameter may be a parameter, such as RSRQ, that is correlated with Channel Qualify Indictor. The parameter (e.g., RSRQ) may be generated by averaging measured values of the parameter over a pre-determined period of time. At step 2030, the client device calculates an estimate of Channel Quality Indicator (CQI) using the radio condition parameter. Calculation of CQI may use one or more equations (e.g., a liner equation) derived by analyzing field data using regression analysis. The equation(s) represents the correlation between CQI and the radio condition parameter. At step 2040, the client device determines a first Modulation and Coding Scheme (MCS) in accordance with the estimate of CQI. Determination of the first MCS may be performed by using, e.g., a mapping table, or equation(s). The mapping table may be a look-up table derived by analyzing field data. The mapping table or look-up table may represent the correction between the CQI and the first MCS.

Referring to FIG. 21, at step 2110, the PTT server receives a first plurality of packets from a talker leg, each of the first plurality of packets comprising a first number of media frames. At step 2120, the first number of media frames is de-bundled from each of the first plurality of packets, thereby forming a plurality of de-bundled media frames. At step 2130, a second number of users are grouped into a third number of user categories, wherein the third number is smaller than the second number. The second number of users may be grouped by their predicted MCS values, and each user category may corresponds to a range of MCS values. At step 2140, a frame rate for each of the third number of user categories are determined. The frame rate for each user category may be determined by the smallest MCS value (e.g., MCS values predicted by the MCS/TBS predictor of the PTT server) of that user category. At step 2150, the de-bundled media frames are delivered to a fourth number of users in a first user category of the third number of user categories. The delivering includes bundling the de-bundled media frames into a second plurality of packets in accordance with a respective frame rate of the first user category, and sending the second plurality of packets to the fourth number of users in the first user category.

Figure 22:
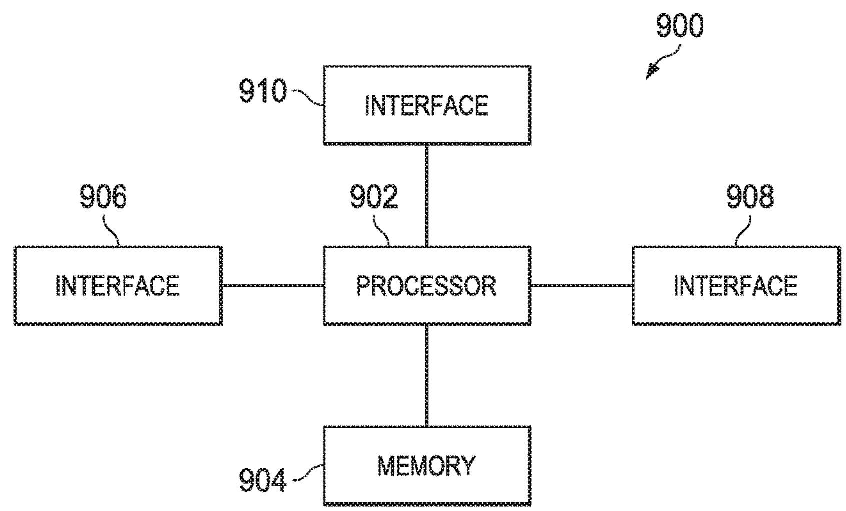
FIG. 22 is a block diagram of an embodiment processing system for performing methods described in FIGS. 20 and 21, in some embodiments.

FIG. 22 is a block diagram of an embodiment processing system 900 for performing methods described herein, which may be installed in a host device (e.g., a PTT server, or a client device). As shown, the processing system 900 includes a processor 902, a memory 904, and interfaces 906-910, which may (or may not) be arranged as shown in FIG. 22. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 910 may be adapted to allow a user or user device (e.g., personal computer (PC), etc.) to interact/communicate with the processing system 900. The processing system 900 may include additional components not depicted in FIG. 22, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 23:
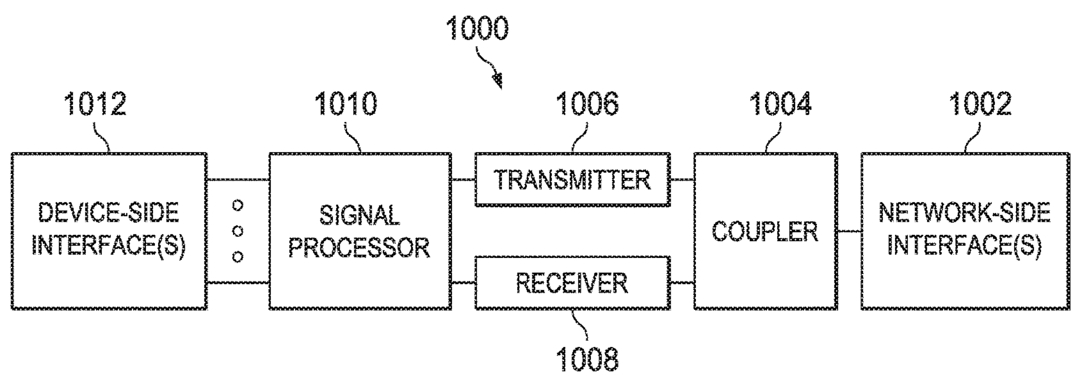
FIG. 23 is a block diagram of a transceiver adapted to transmit and receive signaling over a telecommunications network, in some embodiments.

In some embodiments, one or more of the interfaces 906, 908, 910 connects the processing system 900 to a transceiver adapted to transmit and receive signaling over the telecommunications network. FIG. 23 is a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, a method of operating a client device in a Push-to-talk (PTT) network includes monitoring, by the client device, radio conditions of the PTT network, and generating a radio condition parameter by the client device. The method also includes calculating, by the client device, an estimate of Channel Quality Indicator (CQI) using the radio condition parameter, and determining, by the client device, a first Modulation and Coding Scheme (MCS) in accordance with the estimate of CQI.

In other embodiments, a Push-to-talk (PTT) network server includes one or more processors, and a non-transitory computer readable storage medium storing programming for execution by the one or more processors. The programming including instructions to receive a first signaling message from a first client device during the setup of a first call session, wherein the first signaling message comprises a first modulation and coding scheme (MCS) and a first packet bundling rate calculated by the first client device, wherein the first packet bundling rate corresponds to a number of media frames that could be accommodated in a packet. The programing also includes instructions to send a second signaling message to the first client device in response to the first signaling message, wherein the second signal message includes a second MCS and a second packet bundling rate. The programming further includes instructions to transmit voice data to and receive voice data from the first client device using the second MCS and second packet bundling rate.

In yet other embodiments, a method of operating a Push-to-talk (PTT) server includes receiving, by the PTT server, a first plurality of packets from a talker leg, each of the first plurality of packets comprising a first number of media frames, de-bundling the first number of media frames from each of the first plurality of packets, thereby forming a plurality of de-bundled media frames, and grouping a second number of users into a third number of user categories, where the third number is smaller than the second number. The method further includes determining a frame rate for each of the third number of user categories, and delivering the de-bundled media frames to a fourth number of users in a first user category of the third number of user categories. The delivering includes bundling the de-bundled media frames into a second plurality of packets in accordance with a respective frame rate of the first user category, and sending the second plurality of packets to the fourth number of users in the first user category.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a client device in a Push-to-talk (PTT) network, the method comprising:

monitoring, by the client device, radio conditions of the PTT network;

generating a radio condition parameter by the client device;

calculating, by the client device, an estimate of Channel Quality Indicator (CQI) using the radio condition parameter; and determining, by the client device, a first Modulation and Coding Scheme (MCS) in accordance with the estimate of CQI, wherein the determining the first MCS comprises:

comparing the estimate of CQI with a pre-determined set of ranges for CQI, wherein the each of the pre-determined set of ranges corresponds to a pre-determined MCS;

identifying, among the pre-determined set of ranges, a first range to which the estimate of CQI belongs; and returning the pre-determined MCS corresponding to the first range as the first MCS;

determining a Transport Block Size (TBS) index from the first MCS;

determining a TBS in accordance with the TBS index and a maximum number of Physical Resource Block (PRB); and calculating a plurality of packet sizes for a codec over a range of frame rates, wherein each of the plurality of packet sizes corresponds to a different frame rate in the range of frame rates, wherein each frame rate of the range of frame rates corresponds to a different number of media frames aggregated in a packet; and determining a first frame rate in accordance with the TBS and the plurality of packet sizes.

2. The method of claim 1, wherein the radio condition parameter is a Reference Signal Received Qualify (RSRQ) of the PTT network.

3. The method of claim 2, wherein the generating comprises:

calculating an average value of RSRQ using measured values of RSRQ in a pre-determined period of time; and using the calculated average value of RSRQ as the radio condition parameter.

4. The method of claim 2, wherein the calculating comprises calculating the estimate of CQI using a linear equation CQI_e=m+n×RSRQ, wherein CQI_e is the estimate of CQI, and m and n are coefficients of the linear equation.

5. The method of claim 4, further comprising:

updating the coefficients of the linear equation with coefficient values provided by a server of the PTT network.

6. The method of claim 1, wherein the determining the TBS index is performed in accordance with Table 7.1.7.1-1 of 3GPP specification TS 36.213, and wherein the determining the TBS is performed in accordance with Table 7.1.7.2.1-1 of 3GPP specification TS 36.213.

7. The method of claim 6, wherein the determining the first frame rate comprises:

comparing each of the plurality of packet sizes with the TBS;

finding, among the plurality of packet sizes, a first packet size that is closest to the TBS, wherein the first packet size is equal to or smaller than the TBS; and returning a frame rate that corresponds to the first packet size as the first frame rate.

8. The method of claim 7, further comprising:

sending, by the client device, the first MCS and the first frame rate to a PTT network server;

receiving a second MCS and a second frame rate from the PTT network server; and transmitting media packets of the client device to the PTT network server using the second MCS and the second frame rate.

9. The method of claim 8, wherein the second MCS is equal to the first MCS, and the second frame rate is equal to the first frame rate.

10. A Push-to-talk (PTT) network server comprising:

one or more processors; and a non-transitory computer readable storage medium storing programming for execution by the one or more processors, the programming including instructions to:

receive a first signaling message from a first client device during the setup of a first call session, wherein the first signaling message comprises a first modulation and coding scheme (MCS) and a first packet bundling rate calculated by the first client device, wherein the first packet bundling rate corresponds to a number of media frames that could be accommodated in a packet;

send a second signaling message to the first client device in response to the first signaling message, wherein the second signal message comprises a second MCS and a second packet bundling rate;

update a set of coefficients stored in the first client device, wherein the set of coefficients are used in an equation for calculating the first MCS using a radio condition parameter; and transmit voice data to and receive voice data from the first client device using the second MCS and second packet bundling rate.

11. The PTT network server of claim 10, wherein the first signaling message is a Session Initiation Protocol (SIP) message, wherein the SIP message has an Extension Header comprising an SIP header with the first MCS and first packet bundling rate appended thereto.

12. The PTT network server of claim 10, wherein the first signaling message is a Session Initiation Protocol (SIP) message, wherein the SIP message has a proprietary header comprising the first MCS and the first packet bundling rate.

13. The PTT network server of claim 10, wherein the first signaling message is a Media Burst Control Protocol (MBCP) message, Hypertext Transfer Protocol (HTTP) message, or Mobile Data Sync mechanism message.

14. The PTT network server of claim 10, wherein the programming further includes instructions to:

store the first MCS and the first packet bundling rate of the first client device in the first call session; and use the stored first MCS and the stored first packet bundling rate for the first client device in a second call session after the first call session, wherein a third signaling message from the first client device to the PTT network server in the second call session does not include a third MCS or a third packet bundling rate.

15. A method of operating a Push-to-talk (PTT) server comprising:

receiving, by the PTT server, a first plurality of packets from a talker leg, each of the first plurality of packets comprising a first number of media frames;

de-bundling the first number of media frames from each of the first plurality of packets, thereby forming a plurality of de-bundled media frames;

grouping a second number of users into a third number of user categories, wherein the third number is smaller than the second number, wherein the grouping comprises grouping the second number of users based on a predicted Modulation and Coding Scheme (MCS) of each of the second number of users;

determining a frame rate for each of the third number of user categories; and delivering the de-bundled media frames to a fourth number of users in a first user category of the third number of user categories, the delivering comprising:

bundling the de-bundled media frames into a second plurality of packets in accordance with a respective frame rate of the first user category; and sending the second plurality of packets to the fourth number of users in the first user category.

16. The method of claim 13, wherein the determining comprises determining the frame rate for each user category based on a smallest predicted MCS of each user category.

* * * * *